(12) United States Patent
Kitamura et al.

(10) Patent No.: US 8,391,576 B2
(45) Date of Patent: Mar. 5, 2013

(54) DEVICE, METHOD AND RECORDING MEDIUM CONTAINING PROGRAM FOR SEPARATING IMAGE COMPONENT, AND DEVICE, METHOD AND RECORDING MEDIUM CONTAINING PROGRAM FOR GENERATING NORMAL IMAGE

(75) Inventors: Yoshiro Kitamura, Ashigarakami-gun (JP); Wataru Ito, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1294 days.

(21) Appl. No.: 12/053,322

(22) Filed: Mar. 21, 2008

(65) Prior Publication Data
US 2008/0232667 A1 Sep. 25, 2008

(30) Foreign Application Priority Data
Mar. 22, 2007 (JP) .................. 2007-075179

(51) Int. Cl.
*G06K 9/00* (2006.01)
(52) U.S. Cl. .................. 382/130; 382/128; 382/155
(58) Field of Classification Search .................. 382/128, 382/130–132, 155
See application file for complete search history.

(56) References Cited

U.S. PATENT DOCUMENTS

| | | | |
|---|---|---|---|
| 6,751,341 B2 | 6/2004 | Oosawa | |
| 6,816,572 B2 * | 11/2004 | Jabri et al. | 378/98.9 |
| 6,917,697 B2 * | 7/2005 | Avinash et al. | 382/132 |
| 6,993,171 B1 * | 1/2006 | Choi | 382/128 |
| 7,068,826 B2 * | 6/2006 | Jabri et al. | 382/128 |
| 7,242,794 B2 | 7/2007 | Imamura et al. | |
| 7,483,554 B2 * | 1/2009 | Kotsianti et al. | 382/128 |
| 7,697,739 B2 * | 4/2010 | Sakaida | 382/128 |
| 7,724,936 B2 * | 5/2010 | Oosawa | 382/132 |
| 8,073,226 B2 * | 12/2011 | Farag et al. | 382/131 |

(Continued)

FOREIGN PATENT DOCUMENTS

| | | |
|---|---|---|
| JP | 2002-152593 A | 5/2002 |
| JP | 2003-006661 A | 1/2003 |

(Continued)

*Primary Examiner* — David A Vanore
*Assistant Examiner* — Wyatt Stoffa
(74) *Attorney, Agent, or Firm* — Sughrue Mion, PLLC

(57) ABSTRACT

A normal image representing a normal structure of a predetermined structure in an input medical image is generated with higher accuracy. Further, an abnormal component in the input medical image is separated with higher accuracy. A supervised learned filtering unit inputs an input image representing a predetermined structure to a supervised learned filter to generate an image representing a normal structure of the predetermined structure. The supervised learned filter is obtained through a learning process using supervisor images, each representing a normal structure of the predetermined structure in a subject (individual), and corresponding training images, each containing an abnormal component in the corresponding subject (individual). Further, a difference processing unit separates an abnormal component in the input image by calculating a difference between the input image and the image representing the normal structure.

17 Claims, 17 Drawing Sheets

U.S. PATENT DOCUMENTS

| | | | |
|---|---|---|---|
| 2004/0013290 A1* | 1/2004 | Krishnan et al. | 382/128 |
| 2004/0264755 A1* | 12/2004 | Sakaida | 382/128 |
| 2005/0100208 A1* | 5/2005 | Suzuki et al. | 382/157 |
| 2006/0247502 A1* | 11/2006 | Chen | 600/300 |
| 2007/0014480 A1* | 1/2007 | Sirohey et al. | 382/240 |
| 2007/0047786 A1* | 3/2007 | Aklilu et al. | 382/128 |
| 2007/0071341 A1* | 3/2007 | Pfister | 382/254 |
| 2007/0086641 A1* | 4/2007 | Nakamura | 382/132 |
| 2008/0232668 A1* | 9/2008 | Kitamura et al. | 382/132 |
| 2009/0028403 A1* | 1/2009 | Bar-Aviv et al. | 382/128 |
| 2009/0190815 A1* | 7/2009 | Dam et al. | 382/131 |
| 2009/0208080 A1* | 8/2009 | Grau et al. | 382/131 |

FOREIGN PATENT DOCUMENTS

| | | |
|---|---|---|
| JP | 2004-041694 A | 2/2004 |
| JP | 2005-012248 A | 1/2005 |
| WO | WO 2007010206 A1 * | 1/2007 |

\* cited by examiner

DEVICE, METHOD AND RECORDING MEDIUM CONTAINING PROGRAM FOR SEPARATING IMAGE COMPONENT, AND DEVICE, METHOD AND RECORDING MEDIUM CONTAINING PROGRAM FOR GENERATING NORMAL IMAGE

BACKGROUND OF THE INVENTION

1. Field of the Invention

The present invention relates to a technique for generating an image representing a normal structure of a predetermined structure within a subject contained in an input medical image, and a technique for separating an abnormal component in the medical image.

2. Description of the Related Art

As a technique for separating an abnormal component in a medical image, a computer-aided imaging diagnosis system (CAD: Computer Aided Diagnosis) has been known. The system automatically detects a candidate abnormal shadow in the image and displays the detected candidate abnormal shadow in an enhanced manner.

For example, a technique has been known, in which a first shape-dependent filter, such as a morphological filter, is used depending on the shape of a small calcification shadow to generate a small structure image, and then a second shape-dependent filter which meets imaging conditions, and the like, of the small structure image is used to generate an enhanced image (see, for example, U.S. Pat. No. 7,242,794).

Further, a technique has been known, in which a model representing a shape and texture of a normal structure of a subject, which is obtained by a technique known as AAM (Active Appearance Models) is applied to an inputted image to generate a normal structure image, and then differences between the inputted image and the normal structure image are calculated to detect an abnormal shadow (see, for example, Japanese Unexamined Patent Publication No. 2004-041694).

However, since abnormal tissues with calcification may take various shapes, there still is a room for improvement in accuracy of recognition, even if the above image recognition technique described in U.S. Pat. No. 7,242,794 is used.

The use of the technique for separating an abnormal component based on differences between the inputted image and the normal structure image described in Japanese Unexamined Patent Publication No. 2004-041694 allows separation of the abnormal component without depending on the shape of the abnormal tissue, however, there still is a room for improvement in accuracy of the generated normal structure image.

SUMMARY OF THE INVENTION

In view of the above-described circumstances, the present invention is directed to providing a device, a method, and a recording medium containing a program for generating a normal image representing a normal structure of a predetermined structure within an input medical image with higher accuracy, and a device, a method and a recording medium containing a program for separating an abnormal component within the input medical image with higher accuracy.

An aspect of the normal image generating device of the invention includes: means to generate a normal image from an input medical image representing a predetermined structure in a subject by inputting the input medical image to a supervised learned filter, the supervised learned filter being obtained through a learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image.

An aspect of the normal image generating method of the invention includes: generating a normal image from an input medical image representing a predetermined structure in a subject by inputting the input medical image to a supervised learned filter, the supervised learned filter being obtained through a learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image.

An aspect of the recording medium containing a normal image generating program of the invention contains a program to cause a computer to carry out the above-described normal image generating method.

The image component separating device of the invention separates an abnormal component in the input medical image using the above-described normal image generating device. Namely, an aspect of subject of the image component separating device of the invention includes: normal image generating means to generate, from an input medical image representing a predetermined structure in a subject, a normal image representing a normal structure of the structure in the subject; and an abnormal component separating means to separate an abnormal component in the input medical image by calculating a difference between the input medical image and the normal image, wherein the normal image generating means includes a supervised learned filter obtained through a learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image, and the normal image generating means generates the normal image by inputting the input medical image to the supervised learned filter.

An aspect of the image component separating method of the invention includes: a first step to generate, from an input medical image representing a predetermined structure in a subject, a normal image representing a normal structure of the structure in the subject; and a second step to separate an abnormal component in the input medical image by calculating a difference between the input medical image and the normal image, wherein the normal image is generated in the first step by inputting the input medical image to a supervised learned filter, the supervised learned filter being obtained through a learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image.

The recording medium containing an image component separating program of the invention contains a program for causing a computer to carry out the above-described image component separating method.

Details of the present invention will be explained below.

The "subject" herein is a concept to distinguish between individuals. That is, "the same subject" means the same individual, and "subjects of the same kind" means different subjects (individuals) having substantially the same size, shape, structure, and radiation absorption property at each site, such as "male adults" or "infants".

The "predetermined structure" may be an imaged site of a human body such as the chest, or a more detailed structure such as bone parts of the chest.

In a case where the predetermined structure is bone parts, the input medical image, the training images and the supervisor images may each be obtained from two radiographic images, which are formed by two patterns of radiations having different energy distributions transmitted through a subject and represent degrees of transmission of the respective radiations through the subject, by calculating a weighted sum for each combination of corresponding pixels between the two radiographic images using predetermined weighting factors. That is, each of the input medical image, the training images and the supervisor images may be obtained by a known energy subtraction technique (see, for example, Japanese Unexamined Patent Publication No. 2002-152593 for a specific technique). The invention may further include means or a processing step to generate the input medical image representing bone parts in this manner.

The "the two radiographic images being formed by two patterns of radiations having different energy distributions transmitted through a subject, and representing degrees of transmission of the respective radiations through the subject" may be obtained in a two shot method in which imaging is carried out twice using two patterns of radiations having different energy distributions, or may be obtained in a one shot method in which radiation is applied once to two storage phosphor sheets stacked one on the other via an additional filter such as an energy separation filter (they may be in contact to or separated from each other) so that radiations having different energy distributions are detected on the two sheets. Analog images representing the degrees of transmission of the radiation through the subject recorded on the storage phosphor sheets are converted into digital images by scanning the sheets with excitation light, such as laser light, to generate photostimulated luminescence, and photoelectrically reading the obtained photostimulated luminescence. Besides the above-described storage phosphor sheet, other means, such as a flat panel detector (FPD) employing CMOS, may be appropriately selected and used for detecting the radiation depending on the imaging method. The "energy distribution" is indicated, for example, by a tube voltage, a maximum value, a peak value or an average value in a spectral distribution of the radiation, presence or absence of an additional filter such as an energy separation filter, or the thickness of the filter.

The "corresponding pixels between the two radiographic images" refers to pixels in the radiographic images positionally corresponding to each other with reference to a predetermined structure (such as a site to be observed or a marker) in the radiographic images. If the radiographic images have been taken in a manner that the position of the predetermined structure in the images does not shift between the images, the corresponding pixels are pixels at the same coordinates in the coordinate system in the respective images. However, if the radiographic images have been taken in a manner that the position of the predetermined structure in the images shifts between the images, the images may be aligned with each other through linear alignment using scaling, translation, rotation, or the like, non-linear alignment using warping or the like, or a combination of any of these techniques. It should be noted that the alignment between the images may be carried out using a method described in U.S. Pat. No. 6,751,341, or any other method known at the time of putting the invention into practice.

The "predetermined weighting factors" are determined according to energy distributions corresponding to the two inputted radiographic images and a component to be separated. Usually, one of two weighting factors has a negative value. That is, the "weighted sum" usually takes the form of weighted subtraction.

The "supervised learned filter" is obtained through a supervised machine learning process, more specifically, a regression learning process. Specific examples of the "learning" technique includes support vector machine (SVM), relevance vector machine (RVM) and artificial neural network (ANN).

Each "training image" and the corresponding "supervisor image" represent the same structure of the same subject, where the training image contains at least an abnormal component and the supervisor image represents a normal structure of the structure. The training image may be artificially generated by imitating an actual medical image. More specifically, an image representing a normal structure is prepared first, and an abnormal component may artificially be added to this image to prepare the training image. In a case of a front chest image, for example, since soft parts have various patterns, the soft parts may be added as an abnormal component to a normal bone part image to generate a training image. It should be noted that, besides the normal component and the abnormal component of the structure, the "training images" may contain noise and/or another structure (for example, soft parts if the structure is bone parts).

Further, the supervised learned filter may be formed by a plurality of filters for different spatial frequency bands obtained through the learning process carried out for the respective spatial frequency bands. A plurality of band-limited images for the respective spatial frequency bands, each representing a component for the corresponding spatial frequency band, may be generated from the input medical image, and each band-limited image may be inputted to corresponding one of the supervised learned filters for the spatial frequency band corresponding to the spatial frequency band of the band-limited image. Examples of a technique for generating the band-limited images from the input medical image, the training images and the supervisor images include Laplacian pyramid decomposition, wavelet transformation, and any other techniques which are known at the time of putting the invention into practice.

An abnormal component image representing the abnormal component separated according to the invention and another image to be combined representing the same site of the same subject imaged from the same observation direction as that of the input medical image may be combined by calculating a weighted sum of each combination of the corresponding pixels between these images using predetermined weighting factors.

The "other image to be combined" may be the input medical image itself, may be a soft part image representing soft parts of the same site of the same subject imaged from the same observation direction as that in the input medical image, or, if the input medical image is an image of extracted bone parts, may be an original image before extraction of the bone parts. The other image to be combined may have been generated by the same modality as that generated the input medical image, or may have been generated by a different modality. Alignment between the images to be combined may be carried out before combining the images, as necessary.

In a case where the other image to be combined is a soft part image, the soft part image may be obtained from two radiographic images, which are formed by two patterns of radiations having different energy distributions transmitted through a subject and represent degrees of transmission of the respective radiations through the subject, by calculating a weighted sum for each combination of corresponding pixels between the two radiographic images using predetermined weighting factors. That is, the soft part image may be obtained by a known energy subtraction technique. The invention may further include means or a processing step to generate the soft part image in this manner. The "soft parts" refers to connective tissues other than bone tissues (bone component) of a living body, and includes fibrous tissues, adipose tissues, blood vessels, striated muscles, smooth muscles, peripheral nerve tissues (nerve ganglions and nerve fibers), and the like.

Before combining the images, the color of the abnormal component in the abnormal component image may be converted into a different color from the color of the other image to be combined, and the converted abnormal component image may be combined with the other image.

Further, since each component distributes over the entire subject, most of the pixels of the abnormal component image have pixel values other than 0. Therefore, most of the pixels of an image obtained through the above-described image composition are influenced by the abnormal component image. For example, if the above-described color conversion is carried out before the image composition, the entire composite image is influenced by the color of the component. Therefore, gray-scale conversion may be carried out so that the value of 0 is assigned to the pixels of the abnormal component image having pixel values smaller than a predetermined threshold, and the converted abnormal component image may be combined with the other image.

DESCRIPTION OF THE PREFERRED EMBODIMENTS

Hereinafter, embodiments of the present invention will be described with reference to the drawings.

Figure 1:
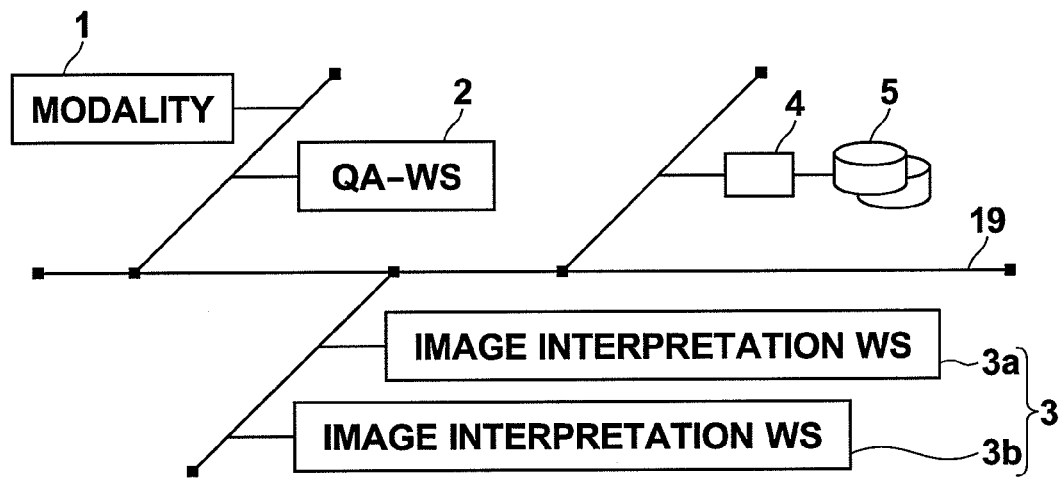
FIG. 1 is a schematic structural diagram illustrating a medical information system incorporating an image component separating device according to embodiments of the present invention.

FIG. 1 illustrates the schematic configuration of a medical information system incorporating an image component separating device according to embodiments of the invention. As shown in the drawing, the system includes an imaging apparatus (modality) 1 for taking medical images, an image quality assessment workstation (QA-WS) 2, an image interpretation workstation 3 (3a, 3b), an image information management server 4 and an image information database 5, which are connected via a network 19 so that they can communicate with each other. These devices in the system other than the database are controlled by a program that has been installed from a recording medium such as a CD-ROM. Alternatively, the program may be downloaded from a server connected via a network, such as the Internet, before being installed.

The modality 1 includes a device that takes images of a site to be examined of a subject to generate image data of the images representing the site, and adds the image data with accompanying information defined by DICOM standard to output the image data with the information as the image information. The accompanying information may be defined by a manufacturer's (such as the manufacturer of the modality) own standard. In this embodiment, image information of the images taken with an X-ray apparatus and converted into digital image data by a CR device is used. The X-ray apparatus records radiographic image information of the subject on a storage phosphor sheet IP having a sheet-like storage phosphor layer. The CR device scans the storage phosphor sheet IP carrying the image recorded by the X-ray apparatus with excitation light, such as laser light, to cause photostimulated luminescence, and photoelectrically reads the obtained photostimulated luminescent light to obtain analog image signals. Then, the analog image signals are subjected to logarithmic conversion and digitalized to generate digital image data. Other specific examples of the modality include CT (Computed Tomography), MRI (Magnetic Resonance Imaging), PET (Positron Emission Tomography), and ultrasonic imaging apparatuses. It should be noted that, in the following description, a set of the image data representing the subject and the accompanying information thereof is referred to as the "image information". That is, the "image information" also includes text information relating to the image.

The QA-WS 2 is formed by a general-purpose processing unit (computer), one or two high-definition displays and an input device such as a keyboard and a mouse. The processing unit has a software installed therein for assisting operations by a medical technologist. Through functions implemented by execution of the software program, the QA-WS 2 receives the image information compliant to DICOM from the modality 1, and applies a standardizing process (EDR process) and processes for adjusting image quality to the received image information. Then, the QA-WS 2 displays the image data and contents of the accompanying information contained in the processed image information on a display screen and prompts the medical technologist to check them. Thereafter, the QA-WS 2 transfers the image information checked by the medical technologist to the image information management server 4 via the network 19, and requests registration of the image information in the image information database 5.

The image interpretation workstation 3 is used by a user of the system, for example, the imaging diagnostician for interpreting the image and creating an image interpretation report. The image interpretation workstation 3 is formed by a processing unit, one or two high-definition display monitors and an input device such as a keyboard and a mouse. Operations carried out at the image interpretation workstation 3 include, for example, request for viewing an image to the image information management server 4, various image processing on the image received from the image information management server 4, displaying the image, separation of an abnormal component in the image, automatic detection and highlighting or enhancement of an area likely to be a lesion in the image, assistance to creation of the image interpretation report, request for registering the image interpretation report in an image interpretation report server (not shown) and request for viewing the report, and displaying the image interpretation report received from the image interpretation report server. The image component separating device of the invention is implemented on the image interpretation workstation 3. It should be noted that the image component separation process of the invention, and other various image processing, image quality and visibility improving processes such as automatic detection and highlighting or enhancement of a lesion candidate and image analysis may not be carried out on the image interpretation workstation 3, and these operations may be carried out on a separate image processing server (not shown) connected to the network 19, in response to a request sent from the image interpretation workstation 3.

The image information management server 4 has a software program installed thereon, which implements a function of a database management system (DBMS) on a general-purpose computer having a relatively high processing capacity. The image information management server 4 includes a large capacity storage forming the image information database 5. The storage may be a large-capacity hard disk device connected to the image information management server 4 via the data bus, or may be a disk device connected to a NAS (Network Attached Storage) or a SAN (Storage Area Network) connected to the network 19.

The image information database 5 stores the image data representing the subject image and the accompanying information registered therein. The accompanying information may include, for example, an image ID for identifying each image, a patient ID for identifying the subject, an examination ID for identifying the examination session, a unique ID(UID) allocated for each image information, examination date and time when the image information was generated, the type of the modality used in the examination for obtaining the image information, patient information such as the name, the age and the sex of the patient, the examined site (imaged site), imaging information (imaging conditions such as a tube voltage, configuration of a storage phosphor sheet and an additional filter, imaging protocol, imaging sequence, imaging technique, whether a contrast agent was used or not, lapsed time after injection of the agent, the type of the dye, radionuclide and radiation dose), and a serial number or collection number of the image in a case where more than one images were taken in a single examination. The image information may be managed in the form, for example, of XML or SGML data.

When the image information management server 4 has received a request for registering the image information from the QA-WS 2, the image information management server 4 converts the image information into a database format and registers the information in the image information database 5.

Further, when the image management server 4 has received a viewing request from the image interpretation workstation 3 via the network 19, the image management server 4 searches the records of image information registered in the image information database 5 and sends the extracted image information to the image interpretation workstation 3 which has sent the request.

As the user such as the imaging diagnostician requests for viewing an image for interpretation, the image interpretation workstation 3 sends the viewing request to the image management server 8 and obtains image information necessary for the image interpretation. Then, the image information is displayed on the monitor screen and an operation such as separation of an abnormal component or automatic detection of a lesion is carried out in response to a request from the imaging diagnostician.

The network 19 is a local area network connecting various devices within a hospital. If, however, another image interpretation workstation 3 is provided at another hospital or clinic, the network 19 may include local area networks of these hospitals connected via the Internet or a dedicated line. In either case, the network 9 is desirably a network, such as an optical network, that can achieve high-speed transfer of the image information.

Figure 2:
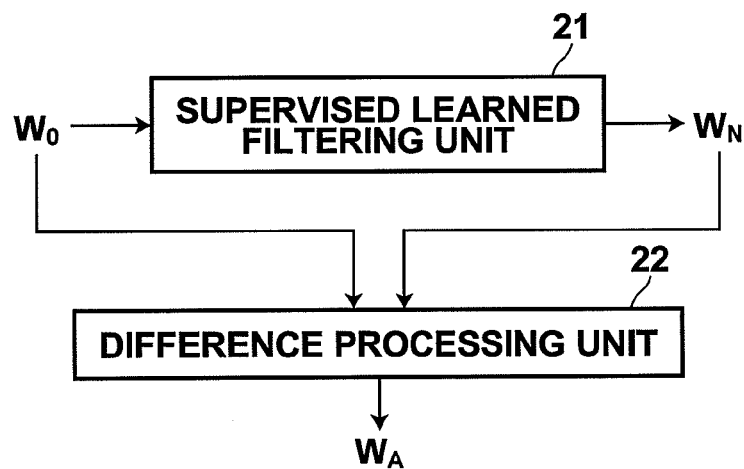
FIG. 2 is a block diagram illustrating the schematic configuration of the image component separating device according to a first embodiment of the invention.

Now, functions of the image component separating device and peripheral elements according to one embodiment of the invention are described in detail. FIG. 2 is a block diagram schematically illustrating the configuration and the data flow of the image component separating device. As shown in the drawing, this device is formed by a supervised learned filtering unit 21 and a difference processing unit 22.

The supervised learned filtering unit 21 processes the inputted image data with a predetermined supervised learned filter and outputs filtered image data. In this embodiment, a normal image generating filter is used for an inputted radiographic image $W_O$ representing the front chest to output a normal image $W_N$ representing a normal state of the front chest.

Figure 3:
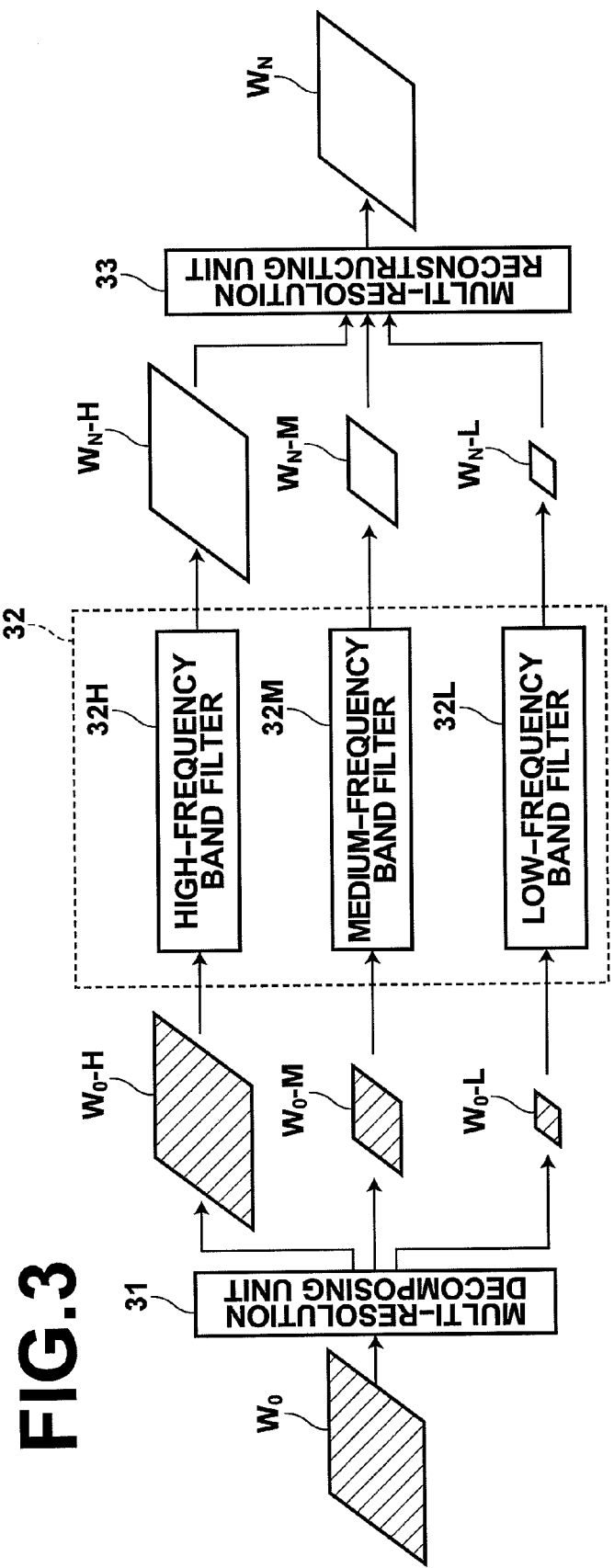
FIG. 3 is a block diagram schematically illustrating the detailed configuration of a supervised learned filtering unit according to embodiments of the invention.

FIG. 3 is a block diagram schematically illustrating the detailed configuration of the supervised learned filtering unit 21. As shown in the drawing, the supervised learned filtering unit 21 includes a multi-resolution decomposing unit 31 that applies multi-resolution conversion to the inputted radiographic image $W_O$ to output a high-frequency band inputted image $W_O$-H, a medium-frequency band inputted image $W_O$-M and a low-frequency band inputted image $W_O$-L for respective multiple spatial frequency bands, a normal image generating filters 32 (a high-frequency band filter 32H, a medium-frequency band filter 32M and a low-frequency band filter 32L) for the respective spatial frequency bands, and a multi-resolution reconstructing unit 33 that applies multi-resolution reconstruction to normal images for the respective spatial frequency bands (a high-frequency band normal image $W_N$-H, a medium-frequency band normal image $W_N$-M and a low-frequency band normal image $W_N$-L in this example), which are obtained by inputting the inputted images for the respective spatial frequency bands to the corresponding normal image generating filters 32H, 32M and 32L for the respective spatial frequency bands, to generate a normal image $W_N$.

Figure 4:
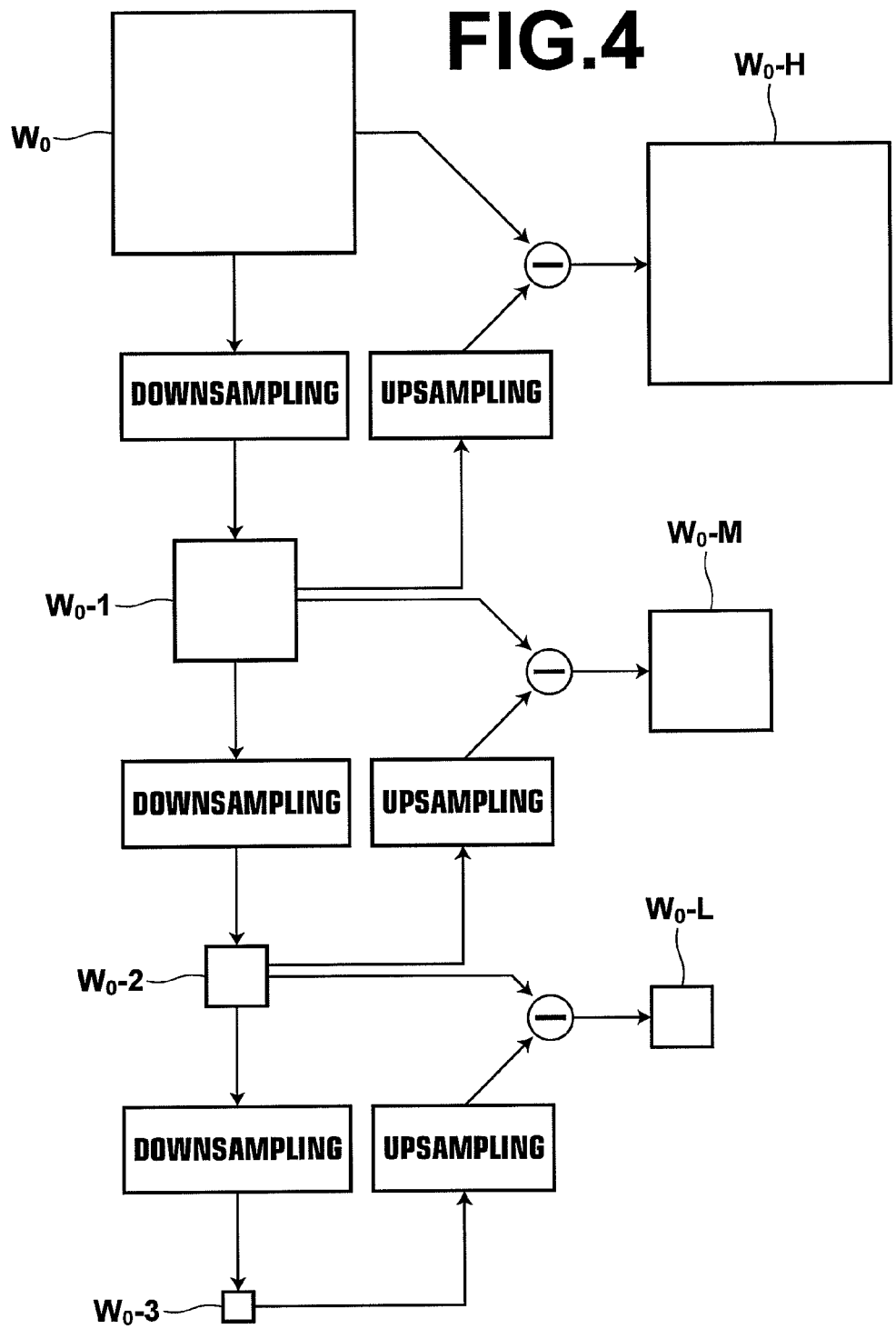
FIG. 4 is a diagram schematically illustrating a process carried out at a multi-resolution decomposing unit.

FIG. 4 is a block diagram schematically illustrating details of the process carried out by the multi-resolution decomposing unit 31. As shown in the drawing, the multi-resolution decomposing unit 31 carries out upsampling on the inputted image $W_O$ and a medium-resolution image $W_O$-1, which is obtained by downsampling the inputted image $W_O$, to provide the high-frequency band image $W_O$-H. The multi-resolution decomposing unit 31 further carries out upsampling on the medium-resolution image $W_O$-1 and a low-resolution image $W_O$-2, which is obtained by downsampling the medium-resolution image $W_O$-1, to provide the medium-frequency band image $W_O$-M. The multi-resolution decomposing unit 31 further carries out upsampling on the low-resolution image $W_O$-2 and a very low-resolution image $W_O$-3, which is obtained by downsampling the low-resolution image $W_O$-2, to provide the low-frequency band image $W_O$-L. It should be noted that the downsampling is achieved by Gaussian low-pass filtering with $\sigma=1$ and ½ thinning of the inputted image, and the upsampling is achieved by cubic B-spline interpolation.

Figure 5:
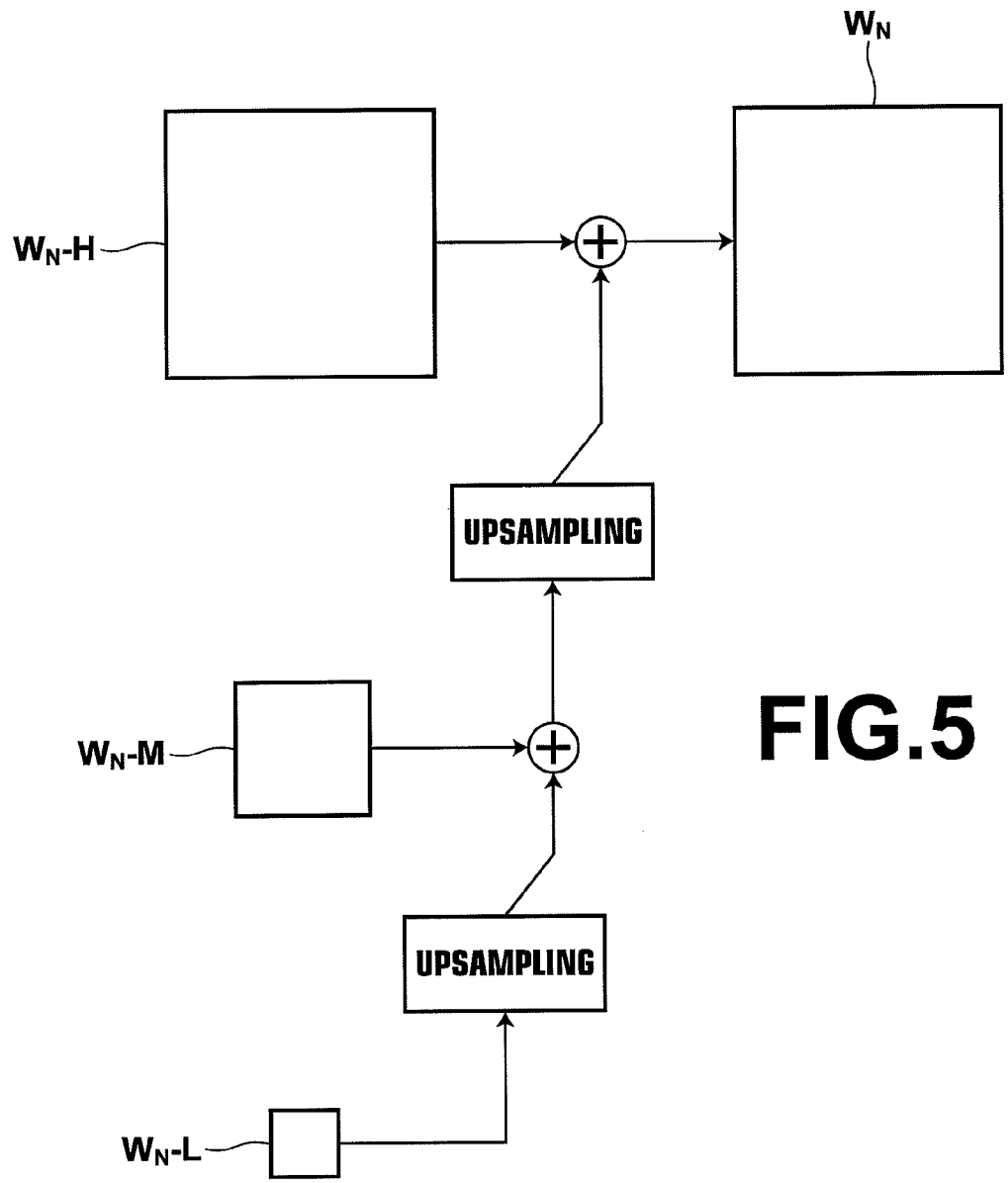
FIG. 5 is a diagram schematically illustrating a process carried out at a multi-resolution reconstructing unit.

FIG. 5 is a block diagram schematically illustrating details of the process carried out by the multi-resolution reconstructing unit 33. As shown in the drawing, the multi-resolution reconstructing unit 33 adds an image obtained by upsampling the low-frequency band normal image $W_N$-L to the medium-frequency band normal image $W_N$-M to obtain an image, and then adds an image obtained by upsampling the above-obtained image to the high-frequency band normal image $W_N$-H to obtain the normal image $W_N$.

It should be noted that the multi-resolution decomposition and reconstruction may be carried out by other methods which are known at the time of putting the invention into practice.

The normal image generating filters 32 are generated through a supervised machine learning process, and include the high-, medium- and low-frequency band filters 32H, 32M and 32L. Each of the filters 32H, 32M and 32L for the respective spatial frequency bands estimates a normal state of the front chest of the subject in its corresponding spatial frequency band from corresponding one of the images $W_O$-H, $W_O$-M and $W_O$-L each representing the front chest of the inputted subject in the corresponding spatial frequency band, and generates a normal image $W_N$-H, $W_N$-M or $W_N$-L representing a result of estimation for the corresponding spatial frequency band. Specifically, each filter 32H, 32M or 32L functions as a non-linear filter, which sets multiple subwindows Sw, each formed by a rectangular area of 5×5 pixels (25 pixels in total), in the image $W_O$-H, $W_O$-M or $W_O$-L representing the front chest of the inputted subject for each spatial frequency band to obtain a feature quantity based on the 25 pixels of each subwindow Sw, and estimates a pixel value of a pixel at the center of each subwindow Sw in the corresponding normal image $W_N$-H, $W_N$-M or $W_N$-L based on the feature quantity obtained for each subwindow Sw.

The normal image generating filters 32 (the high-frequency band filter 32H, the medium-frequency band filter 32M and the low-frequency band filter 32L) are generated through a regression learning process, which is carried out for the respective spatial frequency bands based on a support vector machine technique, using predetermined feature quantities of training images for the respective spatial frequency bands as explanatory variables, and pixel values of predetermined pixels of corresponding supervisor images for the respective spatial frequency bands as objective variables.

Figure 6:
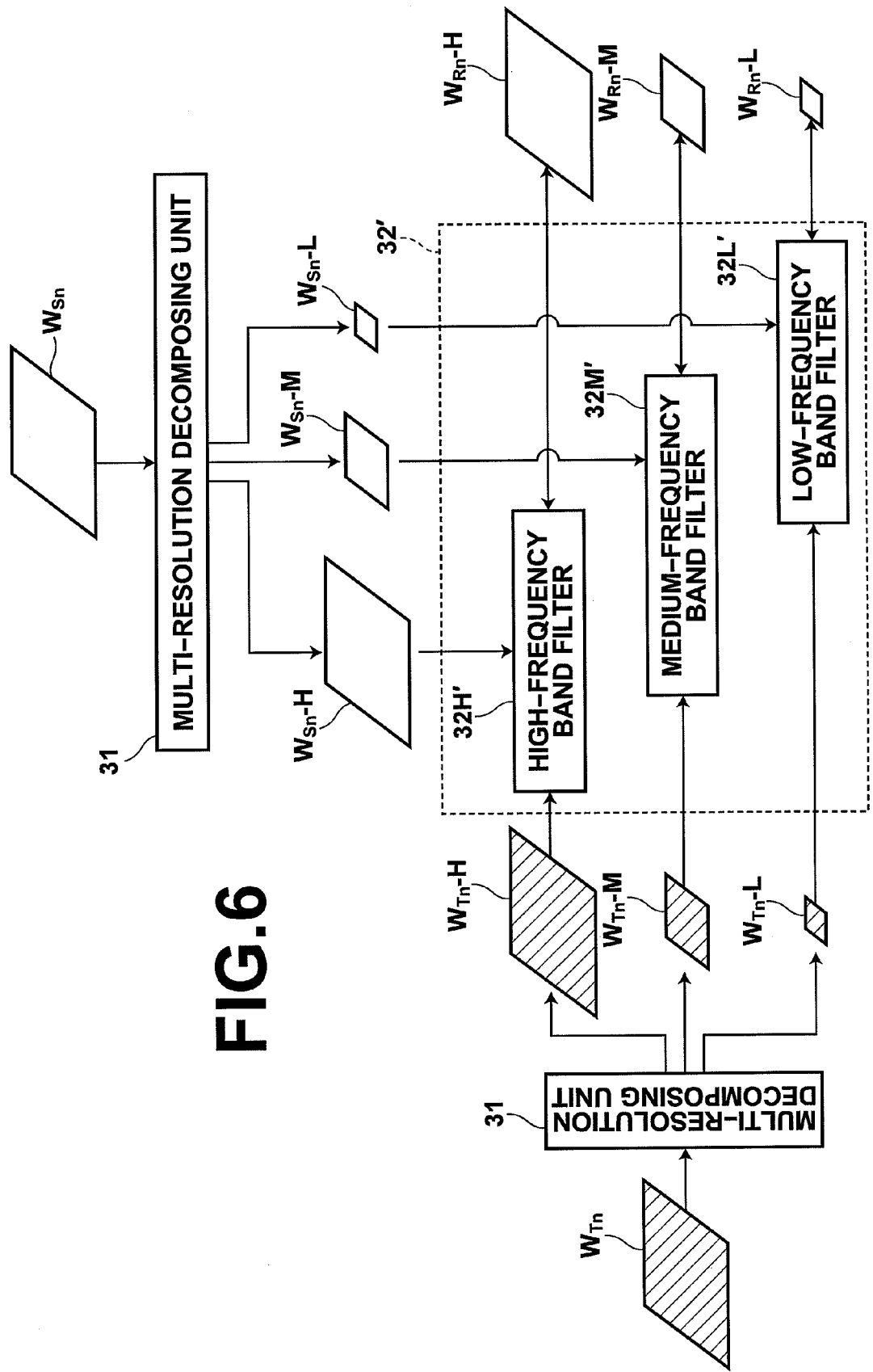
FIG. 6 is a block diagram schematically illustrating the configuration of a device for generating a supervised learned filter.

FIG. 6 is a block diagram schematically illustrating the configuration of a device for carrying out the learning process to generate the normal image generating filters 32 and image data used for the learning. As shown in the drawing, the device is formed by the multi-resolution decomposing unit 31 that decomposes each of multiple training images $W_{Tn}$ (n=1, 2, 3, ... ) and corresponding multiple supervisor images $W_{Sn}$ into images representing high-, medium- and low-frequency bands thereof, and normal image generating filters 32' (a high-frequency band filter 32H', a medium-frequency band filter 32M' and a low-frequency band filter 32L') for the respective spatial frequency bands. The process carried out by the multi-resolution decomposing unit 31 is the same as that described above. The supervisor images $W_{Sn}$ each represents a normal state of the front chest, and the training images $W_{Tn}$ are images of the front chest containing noise, an abnormal component, or the like. The supervisor image and the training image having the same value of the suffix "n" represent the chest of the same subject (individual). It should be noted that the normal image generating filters at the learning stage are designated by reference symbols with "'" to distinguish them from the learned normal image generating filters shown in FIG. 3.

In this device, first, the multi-resolution decomposing unit 31 applies multi-resolution conversion to each training image $W_{Tn}$ to generate a high-frequency band training image $W_{Tn}$-H, a medium-frequency band training image $W_{Tn}$-M and a low-frequency band training image $W_{Tn}$-L thereof, and applies multi-resolution conversion to each supervisor image $W_{Sn}$ to generate a high-frequency band supervisor image $W_{Sn}$-H, a medium-frequency band supervisor image $W_{Sn}$-M and a low-frequency band supervisor image $W_{Sn}$-L thereof.

Figure 7:
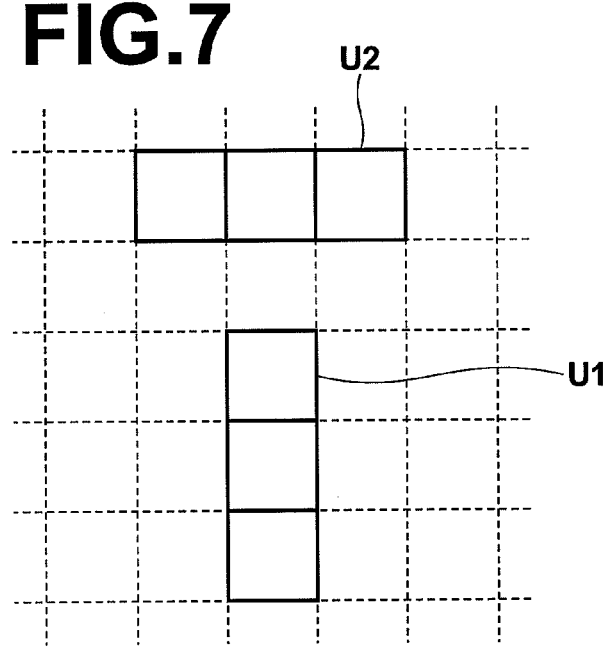
FIG. 7 is a diagram illustrating examples of an area forming a feature quantity within each subwindow in a training image.

In the following example, a learning process for the high-frequency band filter 32H' using the high-frequency band training images $W_{Tn}$-H and the high-frequency band supervisor images $W_{Sn}$-H is described (in the following description, the description "high-frequency band" is omitted). Corresponding small areas, i.e., the subwindows Sw, each formed by a rectangular area of 5×5 pixels (25 pixels in total), are set in the training image $W_{Tn}$-H and the supervisor image $W_{Sn}$-H of the same subject (individual), and a feature quantity is calculated based on 25 pixels forming each subwindow Sw in the training image $W_{Tn}$-H. The feature quantity may be values of the pixels in the subwindow Sw, or may be obtained through special filtering. For example, as shown in FIG. 7, an average of pixel values in an area U1 or U2 formed by adjacent three pixels in the longitudinal or transverse direction in one subwindow Sw may be used as the feature quantity. Alternatively, wavelet transformation may be carried out to use a wavelet coefficient as the feature quantity. Further alternatively, values of corresponding pixels in the respective frequency band images may be used as the feature quantity. Further alternatively, bone areas and non-bone areas may be discriminated from each other in advance, and the result of discrimination may be used as the feature quantity.

Subsequently, for the feature quantity calculated for the subwindow Sw set in the training image $W_{Tn}$-H, a learning sample having a target value which is a value of a pixel at the center of the corresponding subwindow Sw in the supervisor image $W_{Sn}$-H is extracted. This operation is repeated with shifting the subwindow Sw to extract multiple learning samples. Similarly, multiple learning samples are extracted for each combination of the training image $W_{Tn}$-H and the supervisor image $W_{Sn}$-H.

Then, the regression learning process is carried out using the extracted learning samples so that a difference between an outputted image $W_{Rn}$-H, which is outputted when the feature quantities calculated for the respective subwindows Sw set in the training image $W_{Tn}$-H are inputted to the normal image generating filter 32H', and the corresponding supervisor image $W_{Sn}$-H becomes small, to provide the normal image generating filter 32H. Specifically, the regression learning process is carried out according to support vector regression (regression by a support vector machine (SVR)).

Figure 8:
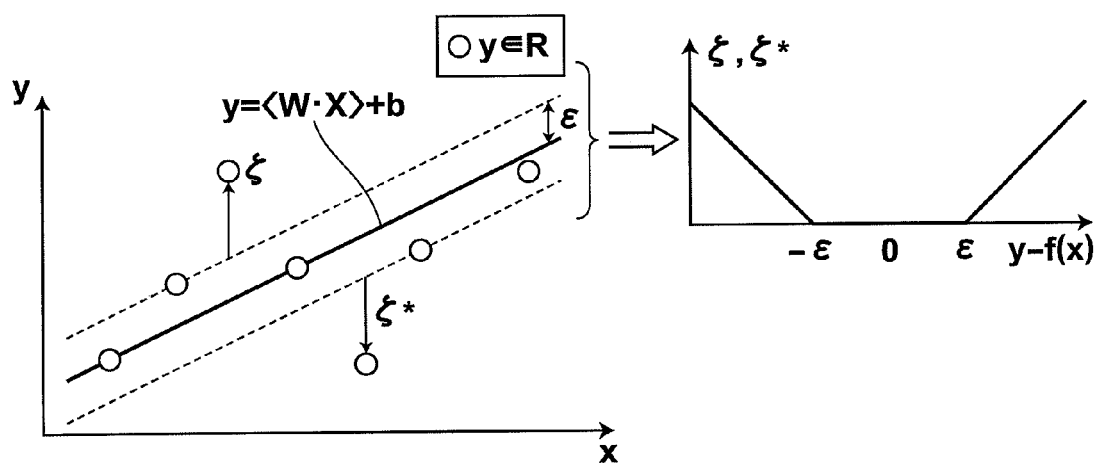
FIG. 8 is a diagram illustrating how an approximate function is found by support vector regression.

For example, with respect to a problem of learning a function to approximate a real value y corresponding to a d-dimensional input vector x, a case where the approximate function f(x) is linear, as expressed by equation (1) below, is considered (see FIG. 8):

$$f(x) = <w \cdot x> + b, w, x \in R^d, b \in R \quad (1).$$

In the $\epsilon$-SVR algorithm proposed by Vapnik, f that minimizes the following loss function (2) is found (for details, see Nello Cristianini and John Shawe-Taylor, "Support Vector Machines", Japanese translation by Tsuyoshi Okita, published by Kyoritsu Shuppan Co., Ltd., Mar. 25, 2005, pp. 149-156, for example):

$$\min \frac{1}{2} <w \cdot w> + C \cdot R_{emp}[f], \quad (2)$$

wherein $<w \cdot w>$ is a term representing complexity of the model that approximates the data. $R_{emp}[f]$ is expressed as equation (3) below:

$$R_{emp}[f] = \frac{1}{l} \sum_{i=1}^{l} |y_i - f(x_i)|_\epsilon = \frac{1}{l} \sum_{i=1}^{l} (\xi_i + \xi_i^*), \quad (3)$$

wherein $|y-f(x)|\epsilon = \max\{0, |y-f(x)|-\epsilon\}$, and this means that errors smaller than $\epsilon$ are ignored. $\xi$ and $\xi^*$ are moderating variables for accepting errors greater than $\epsilon$ in positive and negative directions, respectively. C is a parameter for setting a tradeoff between complexity of the model and moderation of the constraint.

The primary problem presented above is equivalent to solving the following dual problem (4), for which a global solution can certainly be found from the nature of a convex quadratic programming problem:

$$\max \sum_{i=1}^{l} y_i \alpha_i - \epsilon \sum_{i=1}^{l} |\alpha_i| - \frac{1}{2} \sum_{i,j=1}^{l} \alpha_i \alpha_j \langle x_i \cdot x_j \rangle \quad (4)$$

$$\text{constraint} \sum_{i=1}^{l} \alpha_i = 0, -C \leq \alpha_i \leq C, i = 1, \ldots, 1.$$

A regression model obtained by solving this dual problem is expressed as equation (5) below:

$$f(x) = \sum_{i=1}^{l} \alpha_i \langle x_i \cdot x \rangle + b. \quad (5)$$

Although this function is a linear function, it can be extended to a non-linear function by mapping the input X to a higher-dimensional feature space $\Phi(X)$ and considering a vector $\Phi(X)$ in the feature space as the input X (X→$\Phi(X)$). Mapping to a higher-dimensional space is usually accompanied by significant increase in calculation amount. However, by substituting a term of inner product appearing in a formula to be optimized with a kernel function that satisfies a relationship $K(x, y) = <\Phi(x), \Phi(y)>$, the same result is obtained by a calculation in the input dimension as that of a calculation after mapping to a higher dimension. As the kernel function, an RBF kernel, a polynomial kernel, a sigmoidal kernel, or the like, can be used. Non-linear regression learning may be carried out using an RBF kernel, in particular. In this case, optimal values for the parameters $\epsilon$, C for the learning and the parameter $\sigma$ of the RBF kernel may be empirically selected with cross validation.

In this embodiment, a pixel value of each of the pixels (5×5 pixels) within each subwindow Sw set in each training image $W_{Tn}$-H is used as an explanatory variable (input vector x), and a pixel value of the corresponding pixel in the corresponding supervisor image $W_{Sn}$-H is used as an objective variable (real value y). The data to be learned includes the multiple learning samples (about 10,000, for example) which are extracted through the subwindow Sw set at various positions on the training images $W_{Tn}$-H. The regression model obtained by solving the dual problem forms the supervised learned filter 32H, which outputs the normal structure $W_N$-H according to local patterns of the input medical image $W_0$-H. Therefore, in the operation of estimating the normal structure, the supervised learned filters 32 are applied to and scan each pixel of the frequency band images of the input medical image $W_0$ to generate the normal structure image $W_N$ representing the normal structure.

It should be noted that, before calculating the feature quantity, contrast normalization may be carried out within each subwindow Sw. Specifically, a standard deviation sd of pixel values of the pixels within each subwindow Sw is calculated. Then, the pixel value I of each pixel is normalized so that the standard deviation sd for the subwindow Sw meets a predetermined target value $C_{SD}$, according to equation (6) below, to calculate a normalized pixel value I':

$$I' = I \times (C_{SD}/sd) \quad (6)$$

As a result of the above processing, image components in the training images and the supervisor images for the respective spatial frequency bands have normalized magnitudes of amplitude (contrast). In this manner, the radiographic images for the respective spatial frequency bands to be inputted to the respective normal image generating filters 32 have reduced variation in image patterns, and therefore more accurate estimation of the normal image can be achieved.

It should be noted that, in a case where the contrast normalization is carried out in the learning stage, the contrast normalization is also carried out, as preprocessing at the normal image generating filters 32 when the supervised learned filtering unit 21 generates the normal image $W_N$ from the inputted image $W_0$, on the inputted images $W_0$-H, $W_0$-M and $W_0$-L for the respective spatial frequency bands which have been generated at the multi-resolution decomposing unit 31, so that the normalized images for the respective spatial frequency bands are inputted to the corresponding filters 32H, 32M and 32L. Further, each of the images outputted from the filters 32H, 32M and 32L is multiplied with a multiplicative inverse (sd/CSD) of the coefficient used for the above normalization for each subwindow Sw, before being processed at the multi-resolution reconstructing unit 33.

A learning process for the medium-frequency band filter 32M' using the medium-frequency band training images $W_{Tn}$-M and the medium-frequency band supervisor images $W_{Sn}$-M and a learning process for the low-frequency band filter 32L' using the low-frequency band training images $W_{Tn}$-L and the low-frequency band supervisor images $W_{Sn}$-L are carried out in the same manner as the above-described learning process for the high-frequency band filter 32H', with appropriately substituting the frequency band in the above description with the corresponding frequency band.

The difference processing unit 22 calculates a difference between pixel values of each combination of corresponding pixels of the inputted two images, and outputs a difference image representing the differences between the images. At this time, a lung field area may be extracted using a known lung field recognition process (see, for example, Japanese Unexamined Patent Publication No. 2003-006661) so that the difference processing to extract the abnormal component is carried out only on the area within the lung field.

Now, the workflow and the data flow of the image interpretation using an image component separation process of the invention will be described with reference to the flow chart shown in FIG. 9 and the block diagram shown in FIG. 2.

First, the imaging diagnostician carries out user authentication with a user ID, a password and/or biometric information such as a finger print on the image interpretation workstation 3 for gaining access to the medical information system (#1).

If the user authentication is successful, a list of images to be examined (interpreted) that is based on an imaging diagnosis order issued by an ordering system is displayed on the display monitor. Then, the imaging diagnostician selects an examination (imaging diagnosis) session containing an image to be interpreted $W_0$ from the list of images to be examined through the use of the input device such as a mouse. The image interpretation workstation 3 sends a viewing request with the image ID of the selected image $W_0$ as the search key to the image information management server 4. Receiving this request, the image information management server 4 searches the image information database 5 and obtains an image file (designated by the same symbol $W_0$ as the image for convenience) of the image to be interpreted $W_0$, and then sends the image file $W_0$ to the image interpretation workstation 3 that has sent the request. The image interpretation workstation 3 receives the image file $W_0$ and causes the image to be displayed on the display monitor (#2).

The imaging diagnostician observes the image $W_0$ displayed on the display monitor, and if he or she wants to observe an image of an abnormal component separated from the currently displayed image, he or she selects, with a mouse, or the like, an "abnormal component separation" function from a menu of a user interface displayed on the display monitor. Then, the event of selection of the "abnormal component separation" function from the menu is detected in the image interpretation workstation 3 (#3), and a program for causing the image interpretation workstation 3 to function as the abnormal component separating device shown in FIG. 2 is started. It should be noted that, as a parameter on startup, information (such as a file name) to specify the image $W_0$ to be processed is sent to the supervised learned filtering unit 21.

First, at the supervised learned filtering unit 21, the multi-resolution decomposing unit 31 applies multi-resolution conversion to the inputted radiographic image $W_0$ to output the high-frequency band inputted image $W_0$-H, the medium-frequency band inputted image $W_0$-M and the low-frequency band inputted image $W_0$-L. Then, the inputted images $W_0$-H, $W_0$-M and $W_0$-L are inputted to the corresponding filters 32H, 32M and 32L for the respective spatial frequency bands of the normal image generating filters 32, and each of the filters 32H, 32M and 32L estimates a normal state of the front chest of the subject in the corresponding spatial frequency band to generate the normal image $W_N$-H, $W_N$-M or $W_N$-L representing the result of estimation for the corresponding spatial frequency band. Subsequently, the multi-resolution reconstructing unit 33 reconstructs the generated normal images $W_N$-H, $W_N$-M and $W_N$-L for the respective spatial frequency bands to generate the normal image $W_N$ (#4). Then, information specifying the inputted image $W_0$ and the normal image $W_N$ is sent to the difference processing unit 22.

The difference processing unit 22 calculates a difference between pixel values of each combination of corresponding pixels of the inputted image $W_0$ and the normal image $W_N$, and outputs the difference image representing the differences between the images (#5). This difference image is an abnormal component image $W_A$ representing the abnormal component in the inputted image $W_0$.

The generated abnormal component image $W_A$ is displayed on the display monitor of the image interpretation workstation 3 to be used for image interpretation by the imaging diagnostician (#6).

Figure 10:
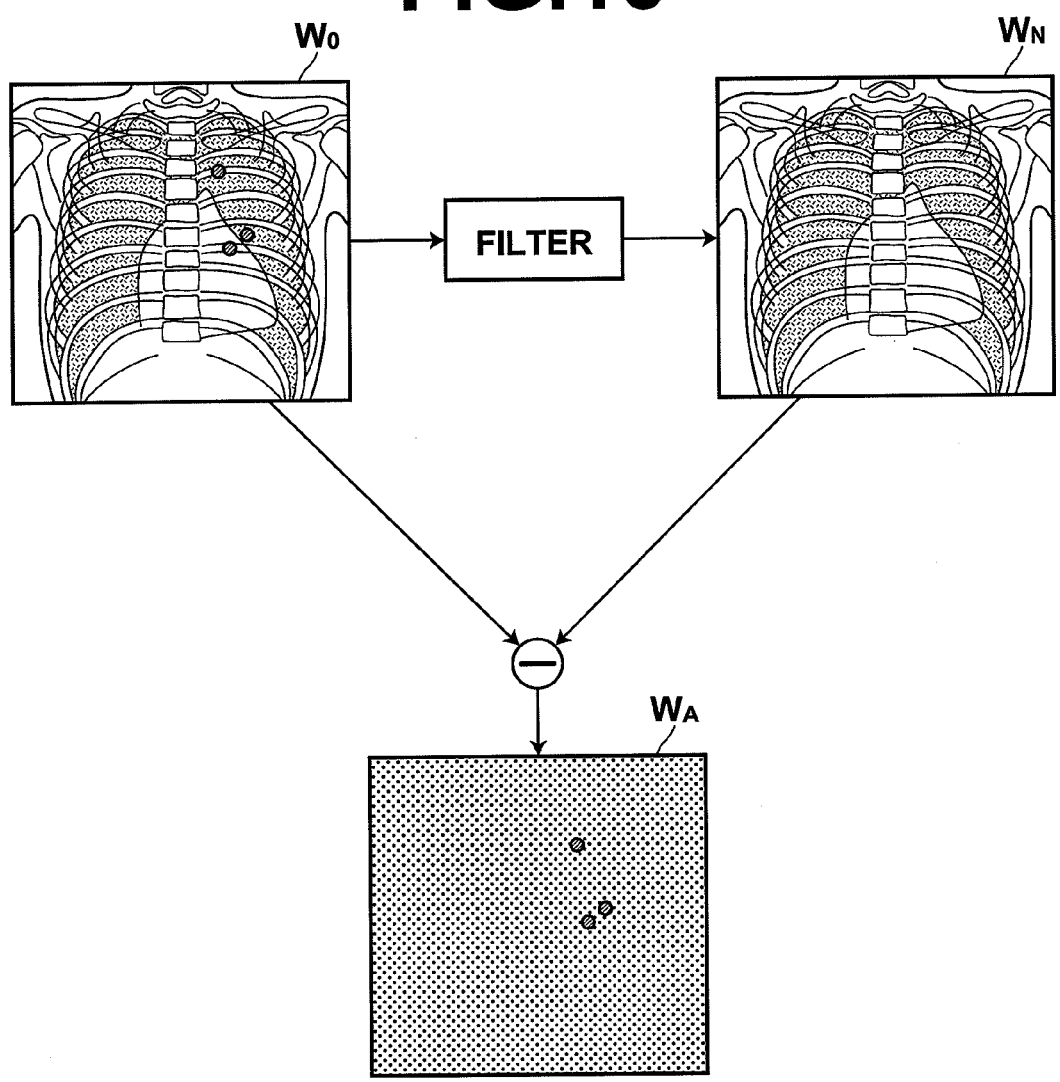
FIG. 10 is a diagram schematically illustrating images that may be generated in an image component separation process according to the first embodiment of the invention.

FIG. 10 schematically illustrates the images that may be generated through the above-described process. As shown in the drawing, the inputted image $W_0$ containing the abnormal component (for example, a calcified component of a soft part) is subjected to non-linear filtering with the normal image generating filters 32, and the normal image $W_N$ representing normal structure portions of the inputted image $W_0$ is generated. Then, the difference processing unit 22 calculates differences between the inputted image $W_0$ and the normal image $W_N$ to generate an image representing portions remaining after normal portions have been removed from the inputted image $W_0$, i.e., the abnormal image $W_A$ representing the abnormal component in the inputted image $W_0$.

In this manner, in the medical information system incorporating the image component separating device according to the first embodiment of the invention, the supervised learned filtering unit 21 inputs the input medical image $W_0$ to the normal image generating filters 32, which are obtained through the learning process using the supervisor images $W_{SN}$ each representing the normal structure of the chest (front) of each subject (individual) and the corresponding training images $W_{TN}$ each containing an abnormal component of the subject (individual), to generate the normal image $W_N$. Therefore, a high recognition rate of the normal structure of the chest in the input medical image $W_0$ can be achieved to generate the normal image $W_N$ with higher accuracy.

Further, the difference processing unit 22 calculates differences between the input medical image $W_0$ and the normal image $W_N$ to generate the image $W_A$ representing the abnormal component separated from the input medical image $W_0$. Therefore, the abnormal component can be separated without depending on the shape of the abnormal tissue. The abnormal component image $W_A$ generated based on the differences between the input medical image $W_0$ and the normal image $W_N$, which has been generated with higher accuracy, has less noise or artifact, and therefore is helpful for improving accuracy and efficiency of imaging diagnosis.

In the above-described embodiment, the normal image generating filter 32 for all the structures of the front chest including the bone part component and the soft part component is used to generate the normal image $W_N$ corresponding to the entire inputted image $W_0$. Therefore, the inputted image contains a large amount of information both in the learning stage and in the filtering stage, and there still is a room for improvement in accuracy of estimation of the normal structure.

Figure 11:
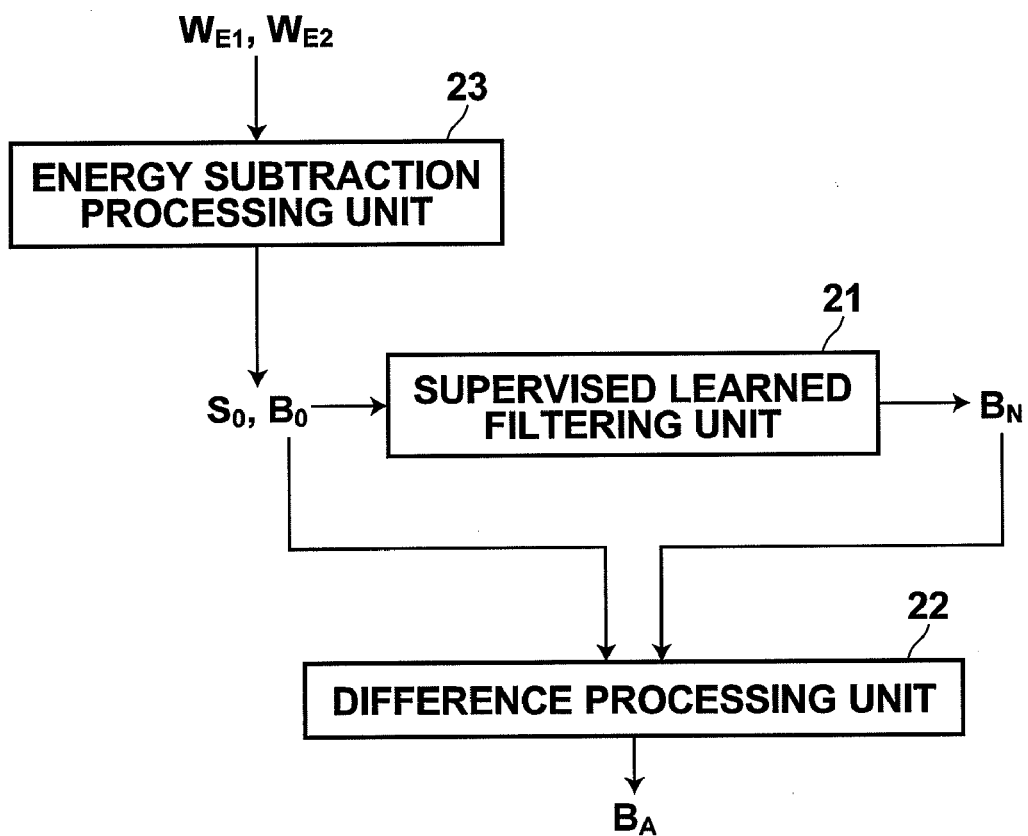
FIG. 11 is a block diagram illustrating the schematic configuration of the image component separating device according to a second embodiment of the invention.

Therefore, in a second embodiment of the invention, the learning process and the filtering process are carried out on more limited objects. FIG. 11 is a block diagram schematically illustrating the functional configuration and the data flow of the image component separating device according to this embodiment. As shown in the drawing, the image component separating device of this embodiment includes an energy subtraction processing unit 23 in addition to the components of image component separating device of the first embodiment (FIG. 2).

In this embodiment, two images, which have been imaged with radiations having different energy distributions, are inputted to the energy subtraction processing unit 23, and the energy subtraction processing unit 23 calculates a weighted sum for each combination of corresponding pixels of the two images using weighting factors selected according to information representing the energy distributions of the respective images (tube voltages in this example) and a component to be separated (the soft part and the bone part in this example), to generate and output a bone part image representing the bone parts and a soft part image representing the soft parts in the inputted images. In this embodiment, the radiographic images to be inputted are assumed to be front chest images obtained by a two shot method where imaging is carried out twice using two patterns of radiations having different tube voltages, and the energy distribution information represents the tube voltages.

The energy distribution information is obtained by analyzing the accompanying information of the image data of the inputted radiographic images. The weighting factors used for the respective inputted images are obtained from a look-up table or a function that defines or outputs weighting factors for the respective inputted images according to the energy distribution information of the inputted images and the component to be separated (bone part, soft part). It should be noted that, in order to mitigate an effect of a beam hardening phenomenon on separation of the respective components, in which the energy distribution of the applied radiation changes depending on the thicknesses of components in the subject, a parameter having a predetermined relationship with the thickness of each component (such as a difference between pixel values (logarithmic values of amounts of radiation) of each combination of corresponding pixels of the two images) may be used to determine the weighting factor for each pixel (see, for example, Japanese Unexamined Patent Publication No. 2002-152593). The corresponding pixels between the images may be identified by detecting a structure, such as a marker or the rib cage, in the images and aligning the images with each other based on the detected structure through a known linear or nonlinear transformation. Alternatively, the two images may be taken with an X-ray apparatus having an indicator for indicating a timing for breathing by the subject (see, for example, Japanese Unexamined Patent Publication No. 2005-012248) so that the two images are taken at the same phase of breathing. In this case, pixels at the same coordinates in the two images can simply be identified as the corresponding pixels, without need of alignment between the images.

Further, in the supervised learned filtering unit 21, a normal bone part image generating filter is used, which outputs a normal bone part image $B_N$ representing a normal structure of the bone parts for the inputted bone part image $B_0$ representing the bone parts of the front chest. The normal bone part image generating filter includes the filters 32H, 32M and 32L for the respective spatial frequency bands. The filters 32H, 32M and 32L are non-linear filters, each of which estimates a normal structure of the bone parts of the subject for the corresponding spatial frequency band from a corresponding inputted image representing the bone parts of the subject for corresponding one of the three spatial frequency bands, and three normal bone part images representing the results of estimation for the respective spatial frequency bands are generated. These filters are generated through the regression learning process, which is carried out for the respective spatial frequency bands based on the support vector machine technique. In this learning process, explanatory variables are predetermined feature quantities in training images for the respective spatial frequency bands, which contain components other than the bone parts (such as soft parts, a lesion such as calcification, noise, or the like), and objective variables are pixel values of predetermined pixels of corresponding supervisor images for the respective spatial frequency bands, each of which contains only a normal structure of the corresponding bone parts. Details of the function of the supervised learned filtering unit 21 using the normal bone part image generating filter and the generation (learning) method for the normal bone part image generating filter are the same as those described in the first embodiment, except that the "front chest image" in the description in the first embodiment is substituted with "bone part image".

Figure 9:
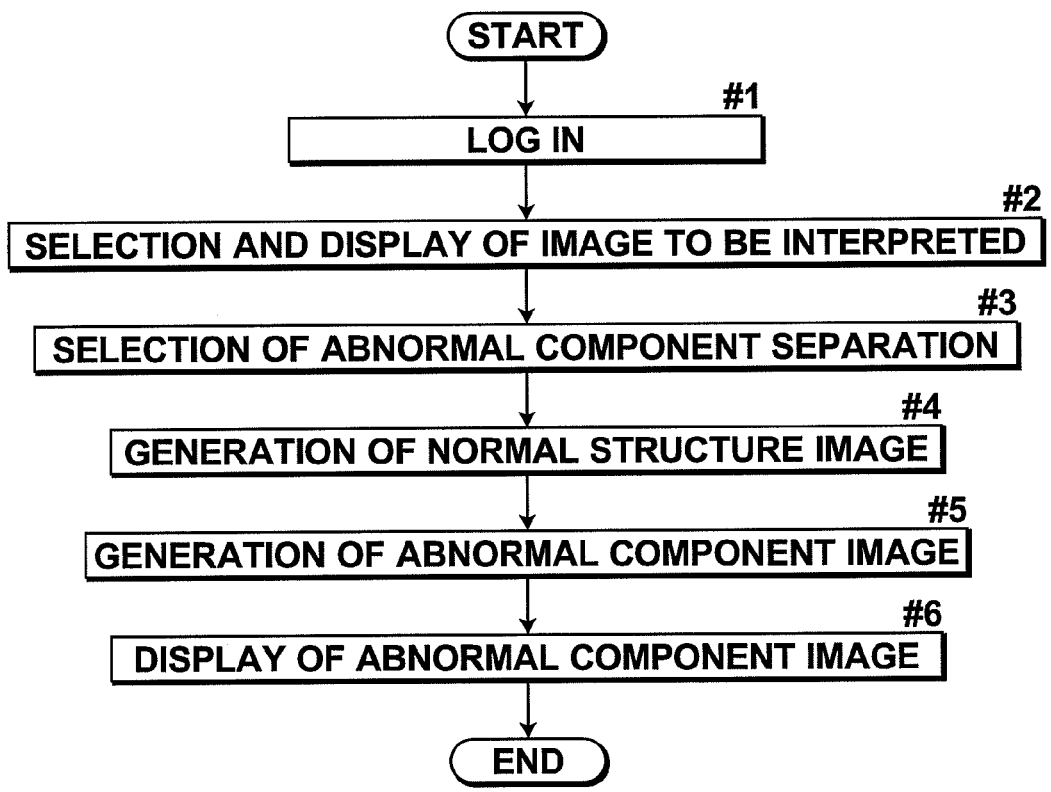
FIG. 9 is a flow chart of an image component separation process and relating operations according to the first and second embodiments of the invention.

In the workflow of image interpretation using the image component separation process of this embodiment, after the radiographic images ($W_{E1}$ and $W_{E2}$) representing the front chest taken with radiations having different tube voltages are received in step #2 of the flow chart of FIG. 9, the image interpretation workstation 3 analyzes the content of an imaging diagnosis order, determines that the received images $W_{E1}$ and $W_{E2}$ are images taken with radiations having different energy distributions, and starts a program that causes the image interpretation workstation 3 to function as the energy subtraction processing unit 23. At this time, as a parameter on startup, information (such as file names) to specify the images $W_{E1}$ and $W_{E2}$ to be processed is sent to the energy subtraction processing unit 23. The started energy subtraction processing unit 23 applies the above-described energy subtraction processing to the inputted images $W_{E1}$ and $W_{E2}$ to generate a soft part image $S_0$ and a bone part image $B_0$, and the image interpretation workstation 3 causes the generated soft part image $S_0$ and the bone part image $B_0$ to be displayed on the display monitor.

When the imaging diagnostician selects the "abnormal component separation" function (#3), the supervised learned filtering unit 21 is started with the bone part image $B_0$ set as the image to be processed, and the normal bone part image $B_N$ is generated through the above-described multi-resolution conversion process, the process by the normal bone part image generating filter and the multi-resolution reconstruction process (#4). Then, information specifying the bone part image $B_0$ and the normal bone part image $B_N$ is sent to the difference processing unit 22.

At the difference processing unit 22, a difference between pixel values of each combination of corresponding pixels of the bone part image $B_0$ and the normal bone part image $B_N$ is calculated to output a difference image representing the differences between these images, i.e., the abnormal bone part image $B_A$ representing the abnormal component in the bone part image $B_0$ (#5), and the abnormal bone part image $B_A$ is displayed on the display monitor of the image interpretation workstation 3 to be used for image interpretation by the imaging diagnostician (#6).

Figure 12:
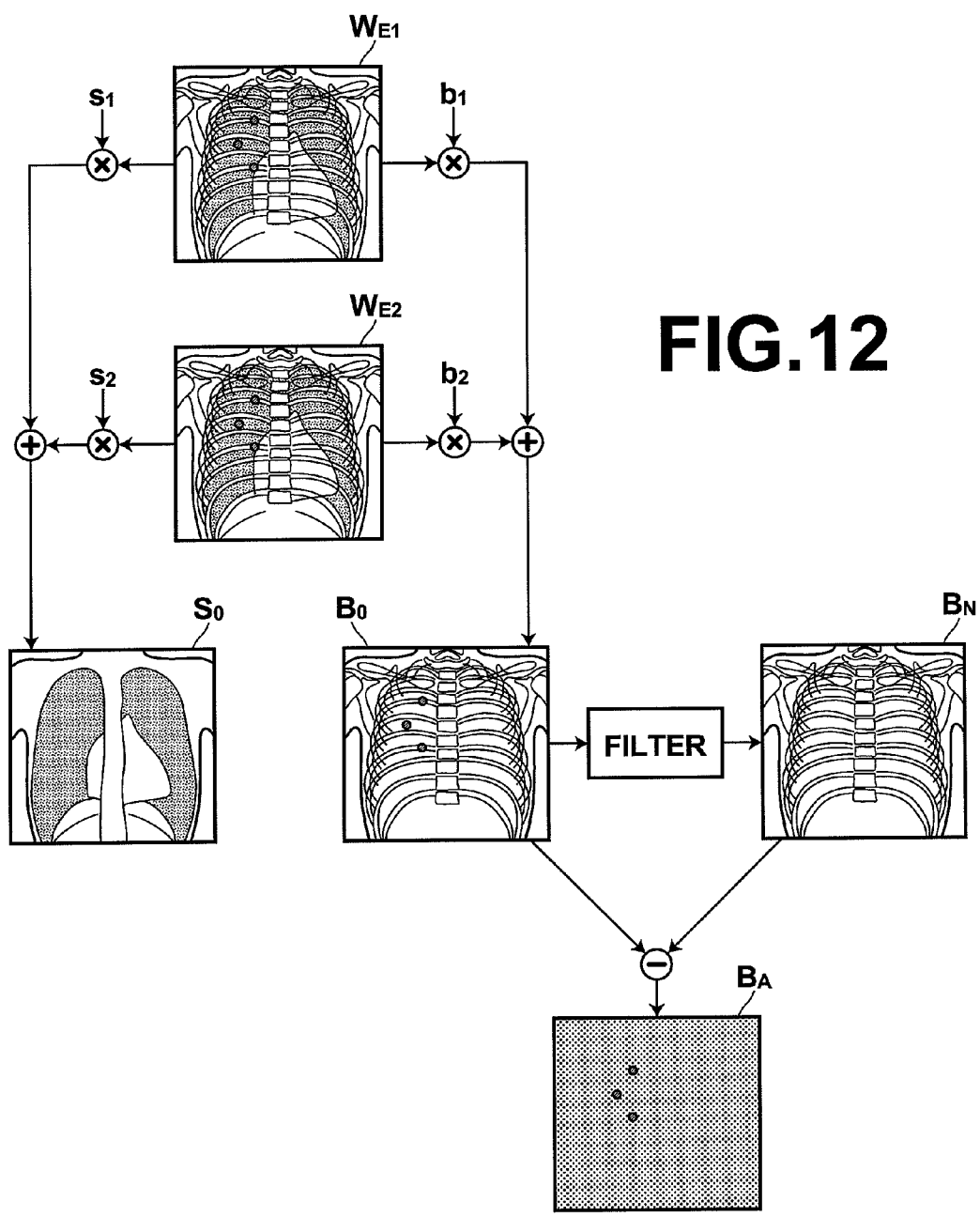
FIG. 12 is a diagram schematically illustrating images that may be generated in an image component separation process according to the second embodiment of the invention.

FIG. 12 schematically illustrates the images that may be generated through the above-described process. As shown in the drawing, the energy subtraction processing unit 23 calculates a weighted sum expressed by $s_1 \cdot W_{E1} + s_2 \cdot W_{E2}$ for each combination of corresponding pixels of the inputted images $W_{E1}$ and $W_{E2}$ to generate the soft part image $S_0$. Similarly, the energy subtraction processing unit 23 calculates a weighted sum expressed by $b_1 \cdot W_{E1} + b_2 \cdot W_{E2}$ for each combination of corresponding pixels of the inputted images $W_{E1}$ and $W_{E2}$ to generate the bone part image $B_0$. Then, the supervised learned filtering unit 22 applies non-linear filtering with the normal bone part image generating filter to the bone part image $B_0$ to generate the normal bone part image $B_N$ representing the normal structure of the bone parts in the bone part image $B_0$. Further, the difference processing unit 22 calculates a difference between the bone part image $B_0$ and the normal bone part image $B_N$ to generate an image representing remaining components of the bone part image $B_0$ from which the normal bone parts have been removed, i.e., the abnormal bone part image $B_A$ representing the abnormal component in the bone part image $B_0$. The abnormal bone part image $B_A$ contains a component that is suspected to be a lesion, such as a calcified soft part.

In this manner, in the medical information system incorporating the image component separating device according to the second embodiment of the invention, the supervised learned filtering unit 21 inputs the bone part image $B_0$ to the normal bone part image generating filter, which has been obtained through the learning process using the supervisor images each representing the normal bone part structure of the (front) chest of each subject (individual) and the corresponding training images each containing an abnormal component of the corresponding subject (individual), to generate the normal bone part image $B_N$. Since differences in the normal bone part structure between individuals are small, i.e., the normal bone parts have a relatively fixed structure for most subjects (individuals), the normal structure can be recognized with higher accuracy than in the first embodiment, thereby allowing generation of the highly accurate normal bone part image $B_N$.

Further, the difference processing unit 22 calculates differences between the bone part image $B_0$ and the normal bone part image $B_N$ to generate the abnormal bone part image $B_A$ representing the abnormal component separated from the bone part image $B_0$, abnormal components representing abnormal tissues having various shapes can be separated with higher accuracy, and this helps to improve accuracy and efficiency of imaging diagnosis.

Furthermore, since the energy subtraction processing unit 23 generates not only the bone part image $B_0$ but also the soft part image $S_0$, the imaging diagnostician can make observation with comparing the abnormal bone part image $B_A$ with the soft part image $S_0$, and this facilitates, for example, observation of conditions of calcification in the soft parts.

It should be noted that, although both the soft part and bone part component images are generated in the above-described embodiment, a user interface for allowing the user to select whether or not the soft part image should be generated may be provided, and the energy subtraction processing unit 23 may generate the soft part image only when the imaging diagnostician has selected generation of the soft part image.

In the above-described two embodiments, the imaging diagnostician makes observation with comparing the generated images. However, it is burdensome for the imaging diagnostician to observe the plurality of images, and there still is a room for improvement in efficiency of diagnosis by reducing the burden.

Figure 13:
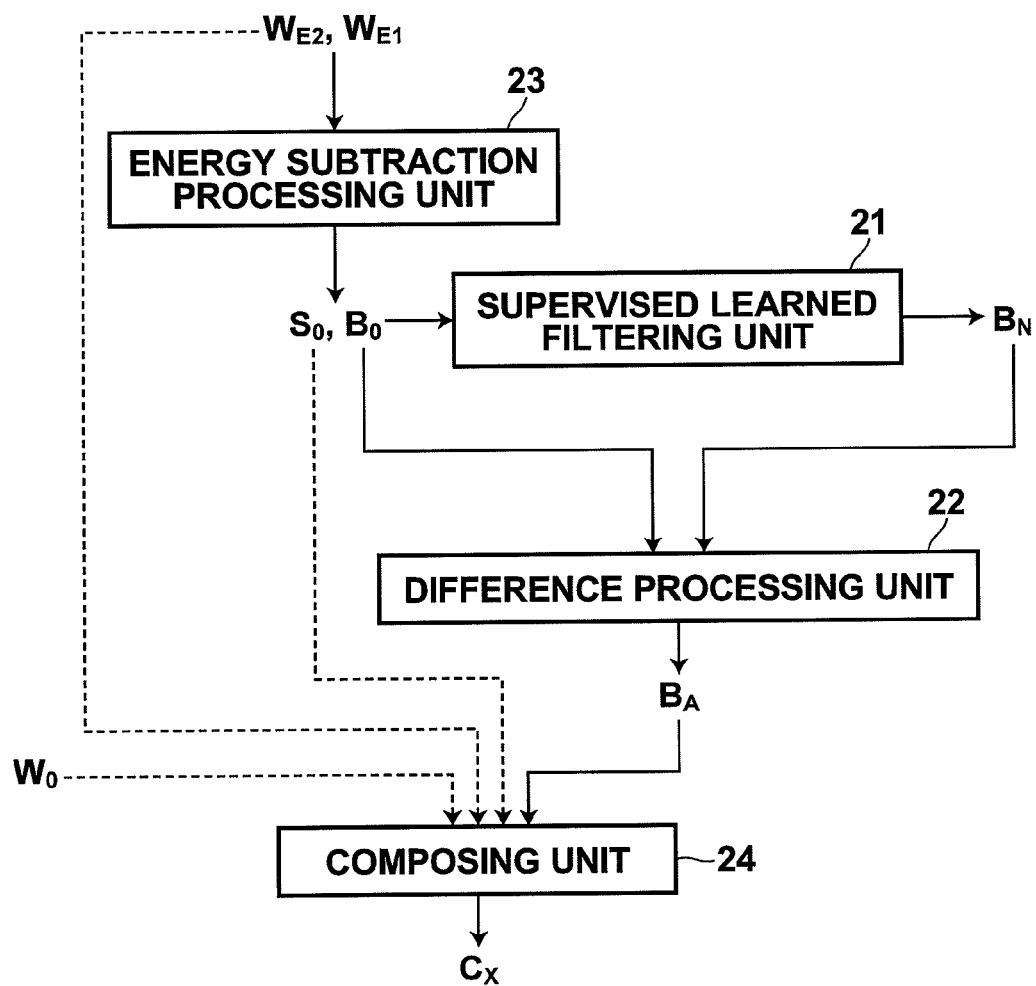
FIG. 13 is a block diagram illustrating the schematic configuration of an image component separating device according to a third embodiment of the invention.

Therefore, in a third embodiment of the invention, a function of generating a composite image by combining images selected by the imaging diagnostician is added to the image component separating device of any of the above-described two embodiments. FIG. 13 is a block diagram schematically illustrating the functional configuration and the data flow of the image component separating device of this embodiment. As shown in the drawing, in this embodiment, a composing unit 24 is added to the image component separating device of the second embodiment.

The composing unit 24 includes a user interface for receiving a selection of an image to be combined with the abnormal bone part image $B_A$, and a composite image generating unit for generating a composite image of these images by calculating a weighted sum, using predetermined weighting factors, for each combination of corresponding pixels between the image to be combined and the abnormal bone part image $B_A$. Identification of the corresponding pixels between the images through alignment between the images is carried out in the same manner as described above for the energy subtraction processing unit 23. With respect to the predetermined weighting factors, appropriate weighting factors for possible combinations of the images to be combined may be set in a default setting file of the system, so that the composite image generating unit may retrieve the weighting factors from the default setting file, or an interface for receiving weighting factors set by the user may be added to the above user interface, so that the composite image generating unit uses the weighting factors set via the user interface.

Figure 14:
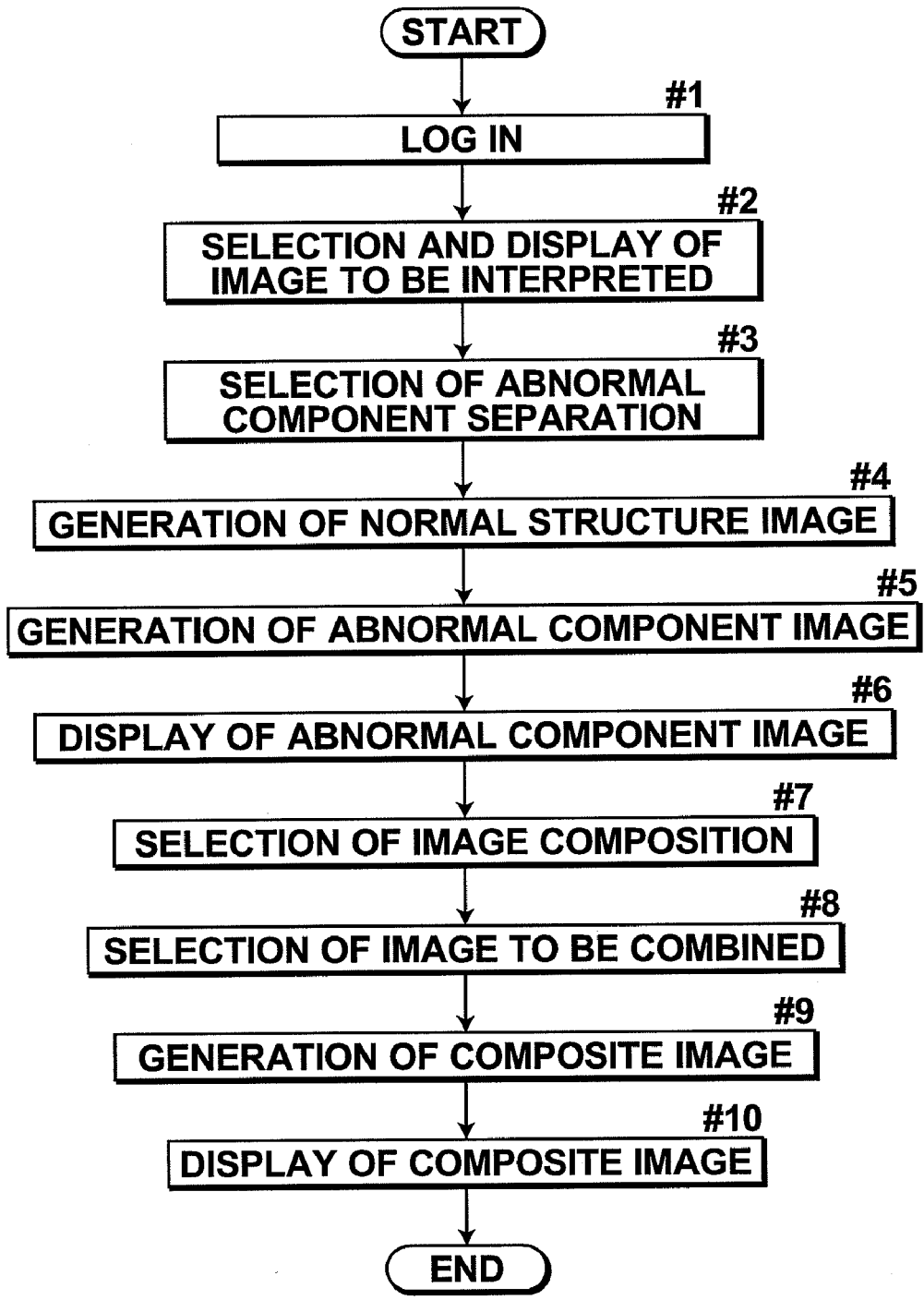
FIG. 14 is a flow chart of an image component separation process and relating operations according to the third embodiment of the invention.

FIG. 14 is a flow chart illustrating the workflow of image interpretation including the image separation process of this embodiment. As shown in the drawing, steps for generating a composite image is added after step #6 of the flow chart shown in FIG. 9.

Similarly to the second embodiment, the difference processing unit 22 generates the abnormal bone part image $B_A$, and the image is displayed on the display monitor of the image interpretation workstation 3. Then, the imaging diagnostician selects an "image composition" function from the menu displayed on the display monitor with a mouse or the like (#7). In response to this operation, the composing unit 24 displays on the display monitor a screen to prompt the imaging diagnostician to select another image to be combined. As a specific example of a user interface implemented on this screen for receiving the selection of the image to be combined, candidate images to be combined, such as the inputted image $W_{E2}$ (the image having the higher tube voltage is preferable), the soft part image $S_0$ and another front chest image $W_0$, may be displayed in the form of a list or thumbnails with checkboxes, so that the imaging diagnostician can click on and check the checkbox corresponding to the image which he or she wishes to combine with the abnormal bone part image $B_A$.

As the imaging diagnostician has selected the other image to be combined (#8), the composite image generating unit of the composing unit 24 calculates a weighted sum for each combination of the corresponding pixels between the selected image and the abnormal bone part image $B_A$ using the predetermined weighting factors, to generate a composite image CX of these images (#9). The generated composite image CX is displayed on the display monitor of the image interpretation workstation 3 and is used for image interpretation by the imaging diagnostician (#10).

Figure 15:
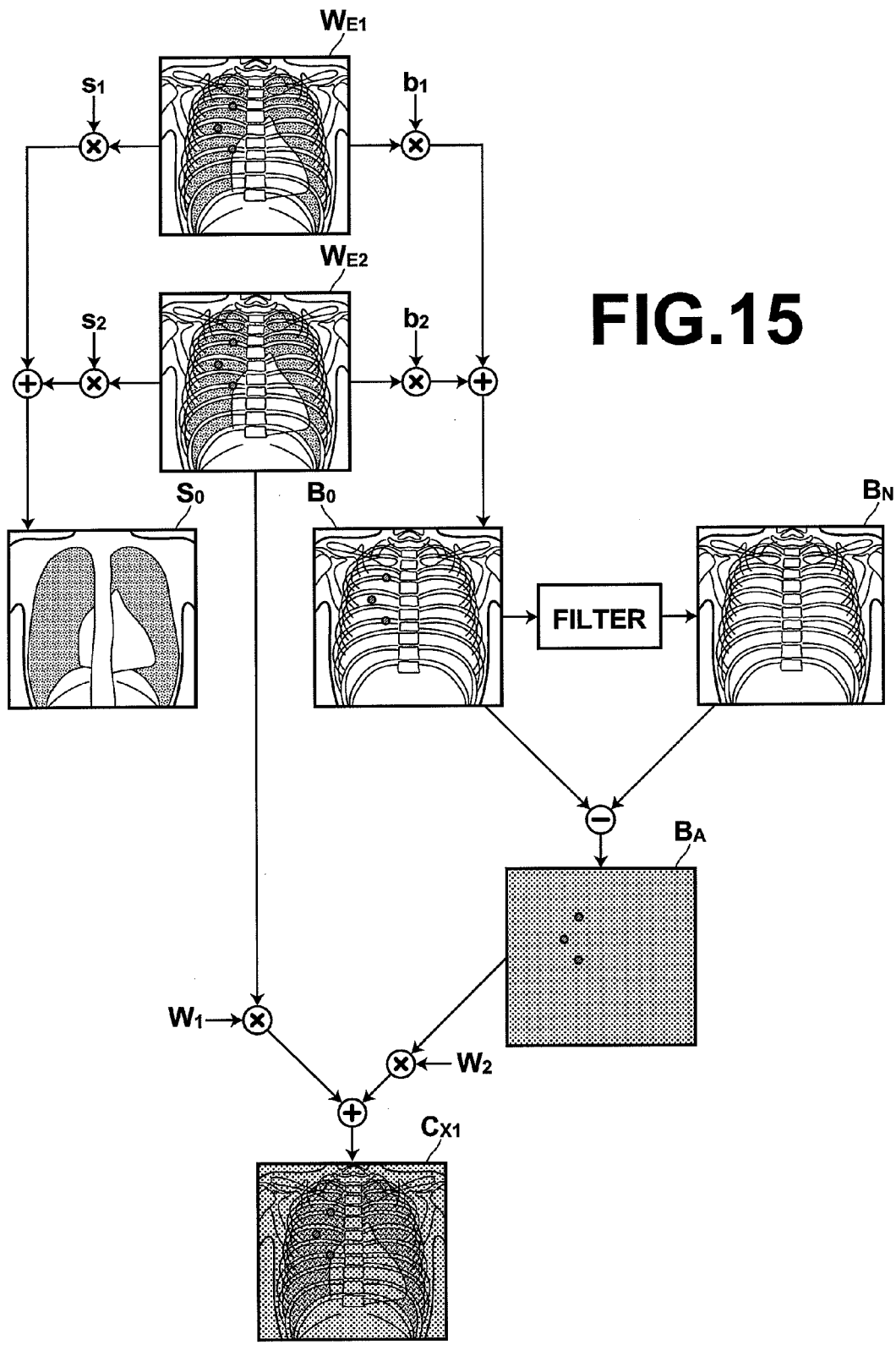
FIG. 15 is a schematic diagram illustrating images that may be generated in the image component separation process according to the third embodiment of the invention when an inputted image and an abnormal bone part image are combined.

FIG. 15 schematically illustrates an image that may be generated when the inputted image $W_{E2}$ is selected as the other image to be combined. First, similarly to the second embodiment (FIG. 12), the energy subtraction processing unit 23 calculates a weighted sum expressed by $s1 \cdot WE1 + s2 \cdot W_{E2}$ for each combination of the corresponding pixels between the inputted images $W_{E1}$ and $W_{E2}$ to generate the soft part image $S_0$, and calculates a weighted sum expressed by $b_1 \cdot W_{E1} + b_2 \cdot W_{E2}$ to generate the bone part image $B_0$. Then, the supervised learned filtering unit 22 applies non-linear filtering with the normal bone part image generating filter to the bone part image $B_0$ to generate the normal bone part image $B_N$ representing the normal structure of the bone parts in the bone part image $B_0$. Then, the difference processing unit 22 calculates differences between the bone part image $B_0$ and the normal bone part image $B_N$ to generate the abnormal bone part image $B_A$ representing the abnormal component in the bone part image $B_0$. Further, in this embodiment, the composing unit 24 uses predetermined weighting factors $w_1$ and $w_2$ to calculate a weighted sum expressed by $w_1 \cdot W_{E2} + W_2 * B_A$ for each combination of the corresponding pixels between the inputted image $W_{E2}$ and the abnormal bone part image $B_A$ to generate a composite image $C_{x1}$ of the inputted image $W_{E2}$ and the abnormal bone part image $B_A$.

Figure 16:
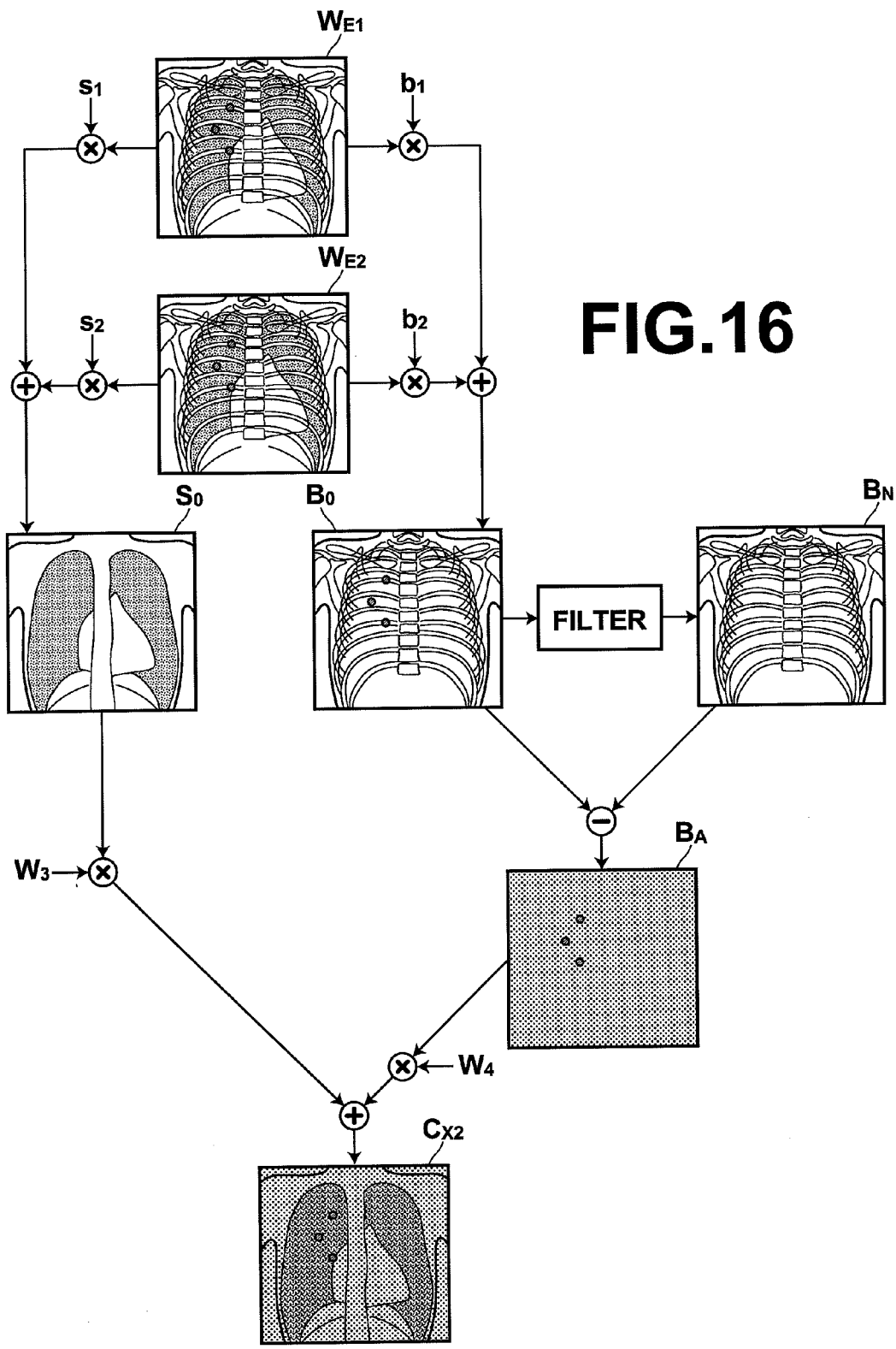
FIG. 16 is a schematic diagram illustrating images that may be generated in the image component separation process according to the third embodiment of the invention when a soft part image and the abnormal bone part image are combined.

FIG. 16 schematically illustrates an image that may be generated when the soft part image $S_0$ is selected as the other image to be combined. First, similarly to FIG. 15, the energy subtraction processing unit 23 generates the soft part image $S_0$ and the bone part image $B_0$, the supervised learned filtering unit 22 generates the normal bone part image $B_N$, and the difference processing unit 22 generates the abnormal bone part image $B_A$. Then, the composing unit 24 uses predetermined weighting factors $w_3$ and $w_4$ to calculate a weighted sum expressed by $w_3 \cdot S_0 + w_4 \cdot B_A$ for each combination of the corresponding pixels between the soft part image $S_0$ and the abnormal bone part image $B_A$ to generate a composite image $C_{x2}$ of the soft part image $S_0$ and the abnormal bone part image $B_A$.

Also in a case where a radiographic image $W_0$ of the same site of the same subject as the inputted images $W_{E1}$, $W_{E2}$ is selected as the other image to be combined, the soft part image $S_0$, the bone part image $B_0$, the normal bone part image $B_N$ and the abnormal bone part image $B_A$ are generated in the same manner as shown in FIGS. 15 and 16. Then, the composing unit 24 calculates a weighted sum for each combination of corresponding pixels between the radiographic image $W_0$ and the abnormal bone part image $B_A$ using predetermined weighting factors to generate a composite image of the radiographic image $W_0$ and the abnormal bone part image $B_A$.

As described above, in the medical information system incorporating the image component separating device according to the third embodiment of the invention, the composing unit 24 generates the composite image of the abnormal bone part image $B_A$ separated by the difference processing unit 22 and another image representing the same subject, which is selected as the image to be combined, by calculating a weighted sum for each combination of the corresponding pixels between the images using the predetermined weighting factors. Therefore, the composite image contains the abnormal component enhanced in a natural manner, and this is convenient for imaging diagnosis.

In the case where the soft part image $S_0$ is selected as the image to be combined, the composite image $C_{x2}$ contains both the normal soft part tissues and the abnormal tissue due to calcification of a soft part. Therefore, the imaging diagnostician only needs to observe the single composite image to diagnose the calcification of the soft part, and this helps to improve efficiency of diagnosis.

Figure 17:
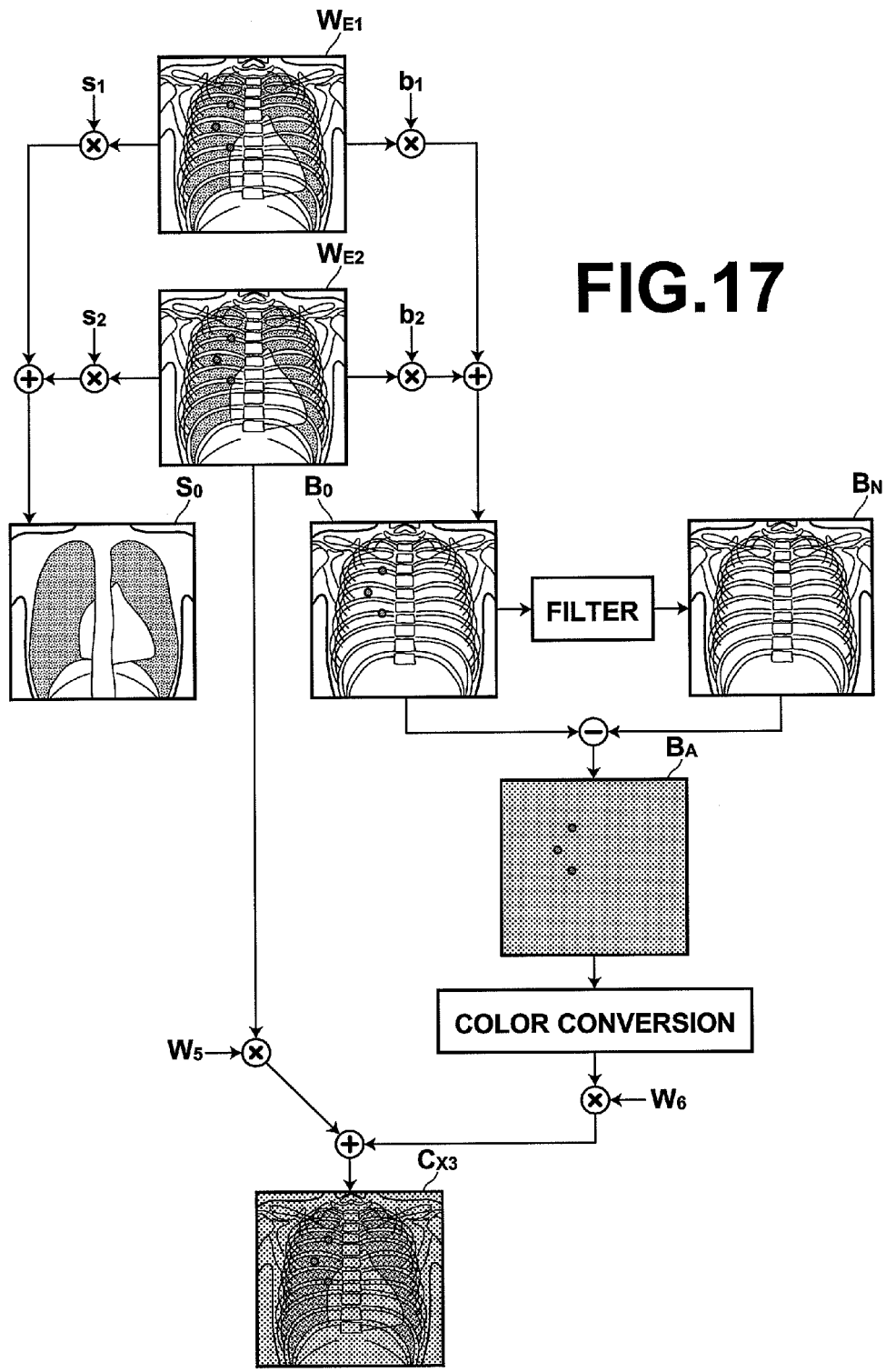
FIG. 17 is a schematic diagram illustrating images that may be generated in a modification of the image component separation process according to the third embodiment of the invention when an inputted image and the abnormal bone part image subjected to color conversion are combined.

In the above-described embodiment, the color of the abnormal bone part image $B_A$ may be converted into a different color from the color of the other image to be combined before combining the images, as in an example shown in FIG. 17. In FIG. 17, after the abnormal bone part image $B_A$ has been generated at the difference processing unit 22 in the same manner as shown in FIGS. 15 and 16, the composing unit 24 converts the abnormal bone part image $B_A$ to assign pixel values of the abnormal bone part image $B_A$ to color difference component Cr in the YCrCb color space, and then, calculates a weighted sum expressed by $w_5 \cdot W_{E2} + w_6 \cdot B_A'$ for each combination of the corresponding pixels between the inputted image $W_{E2}$ and the color converted image $B_A'$ to generate a composite image $C_{x3}$ of the inputted image $W_{E2}$ and the abnormal bone part image $B_A$. Alternatively, the composite image $C_{x3}$ may be generated after a conversion in which pixel values of the inputted image $W_{E2}$ are assigned to luminance component Y and pixel values of the abnormal bone part image $B_A$ are assigned to color difference component Cr in the YCrCb color space.

If the composing unit 24 converts the color of abnormal bone part image $B_A$ into a different color from the color of the other image to be combined before combining the images in this manner, visibility of the abnormal component is further improved.

Figure 18A:
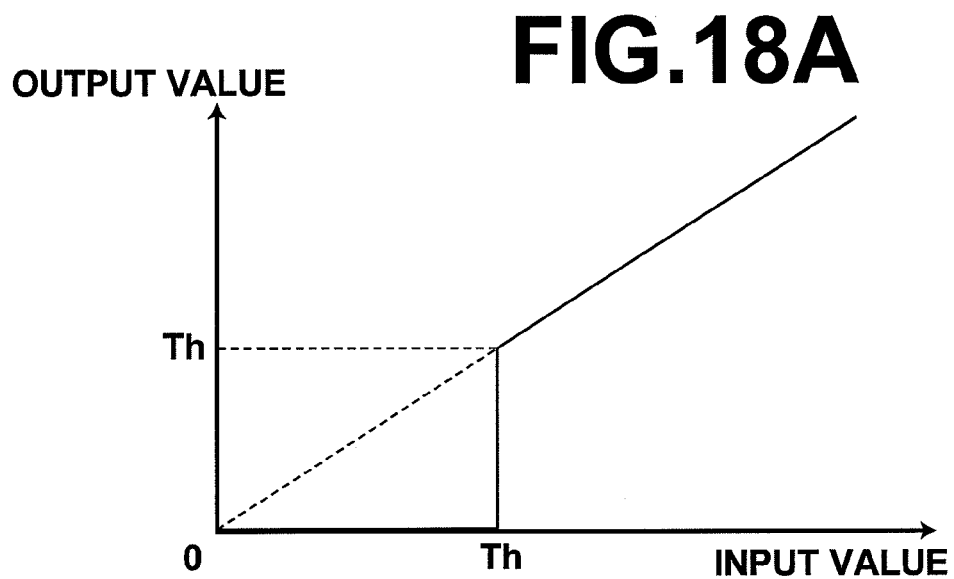
FIGS. 18A and 18B illustrate gray-scale conversion used in another modification of the third embodiment of the invention.
Figure 19:
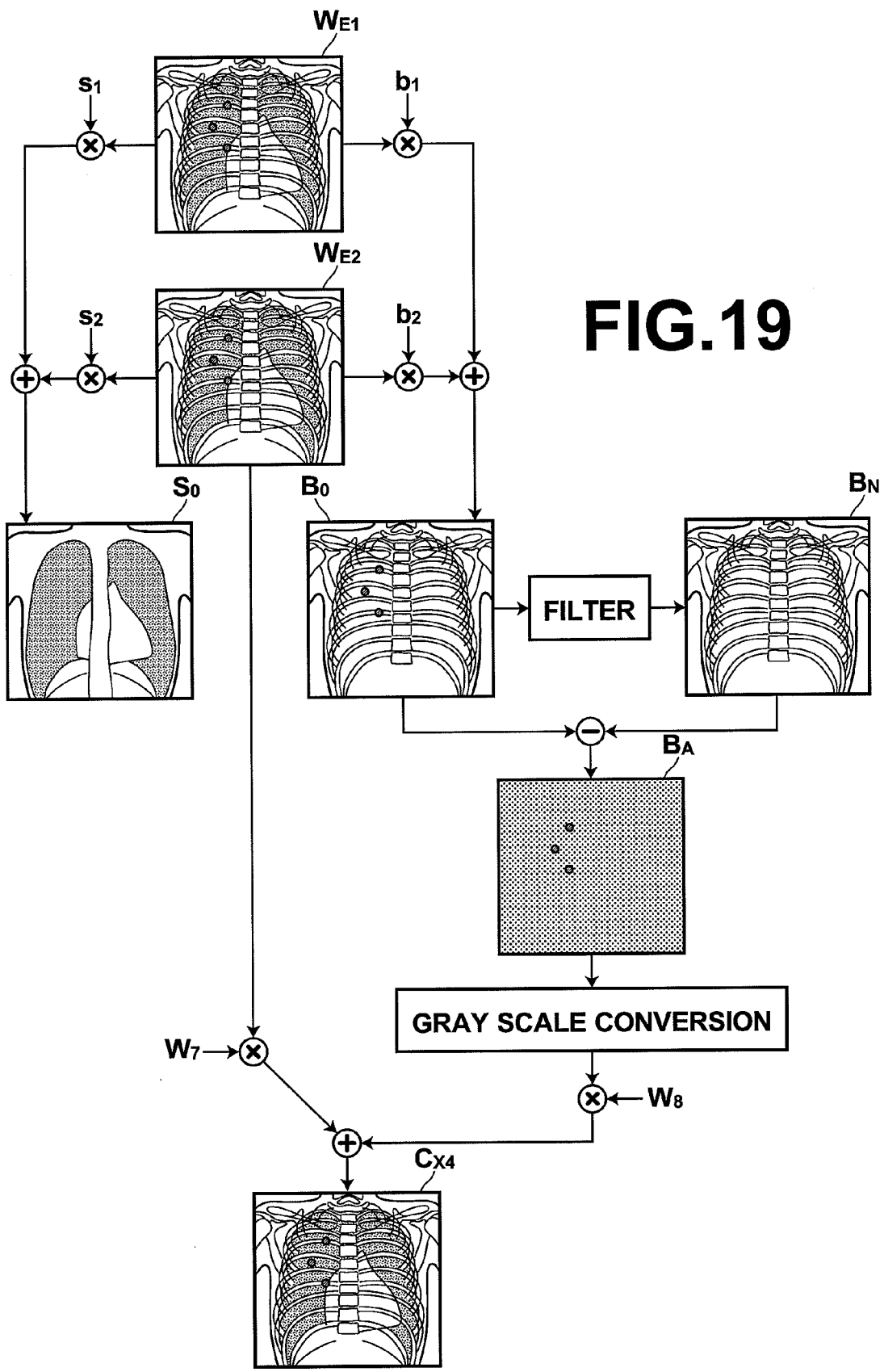
FIG. 19 is a schematic diagram illustrating images that may be generated in yet another modification of the image component separation process according to the third embodiment of the invention when the inputted image and the abnormal bone part image subjected to gray-scale conversion are combined.

In a case where the abnormal bone part image $B_A$ contains many pixels having pixel values other than 0, the composite image is influenced by the pixel values of the abnormal bone part image $B_A$ such that the entire composite image appears grayish if the composite image is a gray-scale image, and the visibility may be lowered. Therefore, as shown in FIG. 18A, gray-scale conversion may be applied to the abnormal bone part image $B_A$ such that the value of 0 is outputted for pixels of the abnormal bone part image $B_A$ having pixel values not more than a predetermined threshold, before being combined with the other image to be combined. FIG. 19 schematically illustrates an image that may be generated in this case. First, the difference processing unit 22 generates the abnormal bone part image $B_A$ in the same manner as shown in FIGS. 15, 16 and 17. Then, the composing unit 24 applies the above-described gray-scale conversion to the abnormal bone part image $B_A$, and then, calculates a weighted sum expressed by $w_7 \cdot W_{E2} + w_8 \cdot B_A''$ for each combination of the corresponding pixels between the inputted image $W_{E2}$ and the converted abnormal bone part image $B_A''$ to generate a composite image $C_{x4}$ of the inputted image $W_{E2}$ and the abnormal bone part image $B_A$. In this composite image, only areas of the abnormal bone part image $B_A$ where the ratio of the abnormal component is high are enhanced, and visibility of the component is further improved.

Figure 18B:
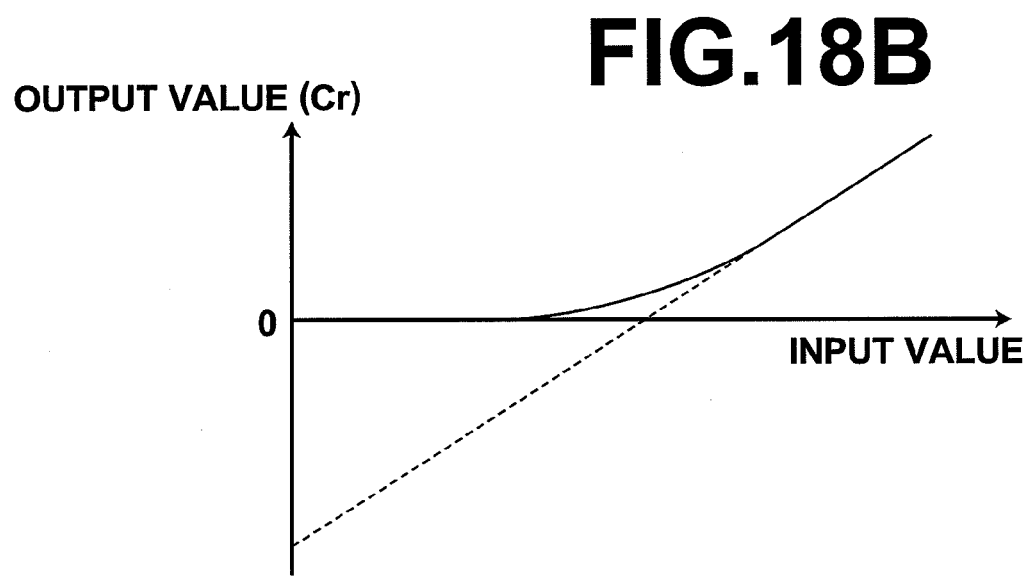

Similarly, if a composite image obtained after the above-described color conversion contains many pixels having values of the color difference component other than 0, the composite image appears as an image tinged with the color according to the color difference component, and the visibility may be lowered. Further, if the color difference component has both positive and negative values, opposite colors appear in the composite image, and the visibility may further be lowered. Therefore, by applying gray-scale conversion to the abnormal bone part image $B_A$ before being combined with the other image to be combined, such that the value of 0 is outputted for the pixels of the abnormal bone part image $B_A$ having values of the color difference component not more than a predetermined threshold, as shown in FIG. 18A for the former case and FIG. 18B for the latter case, a composite image is obtained in which only areas of the abnormal bone part image $B_A$ where the ratio of the abnormal component is high are enhanced, and the visibility of the component is further improved.

It should be noted that the operations carried out by the energy subtraction processing unit 23 in the above-described embodiments may not be carried out on the image interpretation workstation 3, and these operations may be carried out on the modality 1 during imaging to generate the soft part image $S_0$ and the bone part image $B_0$. Then, the image component separating device of the invention on the image interpretation workstation 3 may obtain the soft part image $S_0$ and the bone part image $B_0$ generated on the modality 1 from the modality 1 or the image information database 5.

Further, the user interface included in the composing unit 24 in the above-described embodiment is not necessary if the imaging diagnostician is not allowed to select the other image to be combined and the other image to be combined is determined by the composing unit 24 in a fixed manner, or if the image composition is carried out in a default image composition mode in which the other image to be combined is set in advance in the system, besides a mode for allowing the imaging diagnostician to select the other image to be combined.

According to the invention, a normal image is generated by inputting an input medical image to a supervised learned filter, which provided through a learning process using supervisor images, each representing a normal structure of a predetermined structure in a subject (individual), and corresponding training images, each containing an abnormal component in the subject (individual). Therefore, recognition of a normal structure of the structure in the input medical image can be performed with a high recognition rate, and the normal image with higher accuracy can be generated.

Further, by separating an abnormal component in the input medical image by calculating a difference between the input medical image and the normal image, the abnormal component can be separated without depending on the shape of the abnormal tissue. An abnormal component image generated based on the difference between the input medical image and the normal image generated with higher accuracy contains less noise or artifact, and is helpful for improving accuracy and efficiency in imaging diagnosis.

Furthermore, in a case where the input medical image represents bone parts of the subject, the normal structure can be recognized with higher accuracy since differences in the normal bone part structure between individuals are small and the normal bone parts have a relatively fixed structure for most subjects (individuals).

By combining the abnormal component image separated by the above-described process with another image to be combined which represents the same site of the same subject imaged from the same observation direction as that of the input medical image, the abnormal component appears in the composite image in a naturally enhanced manner, and this is convenient for imaging diagnosis.

If the input medical image is a bone part image, an abnormal component image representing an abnormal tissue with calcification is separated. Further, if the other image to be combined is a soft part image, the composite image represents both the normal soft part tissues and the abnormal soft part tissue with calcification in a single image. Therefore, the imaging diagnostician can diagnose the calcification in the soft parts only by referencing the single composite image, and this is helpful for improving efficiency of diagnosis.

By converting the color of the separated abnormal component into a different color from the color of the other image to be combined before combining the images, visibility of the abnormal component is further improved.

Moreover, by applying gray-scale conversion before combining the images such that the value of 0 is assigned to pixels of the abnormal component image having pixel values smaller than a predetermined threshold, and combining the converted abnormal component image with the other image, an image can be obtained in which only areas in the abnormal component image where the ratio of the abnormal component is high are enhanced, and visibility of the abnormal component is further improved.

It is to be understood that many changes, variations and modifications may be made to the system configurations, the process flows, the table configurations, the user interfaces, and the like, disclosed in the above-described embodiments without departing from the spirit and scope of the invention, and such changes, variations and modifications are intended to be encompassed within the technical scope of the invention. The above-described embodiments are provided by way of examples, and should not be construed to limit the technical scope of the invention.

What is claimed is:

1. An image component separating device comprising:
normal image generating means to generate, from an input medical image representing a predetermined structure in a subject, a normal image representing a normal structure of the structure in the subject; and
an abnormal component separating means to separate an abnormal component in the input medical image by calculating a difference between the input medical image and the normal image,
wherein the normal image generating means comprises a supervised learned filter obtained through a regression learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image the supervised learned filter receives the input of the input medical image and generates the normal image by applying filtering-process to the input medical image, wherein
the supervised learned filter comprises a plurality of filters for different spatial frequency bands obtained through the learning process carried out for the respective spatial frequency bands, and the normal image generating means generates the normal image by generating a plurality of band-limited images for the respective spatial frequency bands from the input medical image, each band-limited image representing a component for the corresponding spatial frequency band, inputting each band-limited image to corresponding one of the supervised learned filters for the spatial frequency band corresponding to the spatial frequency band of the band-limited image, and reconstructing outputted images for the respective spatial frequency bands outputted from the supervised learned filters.

2. The image component separating device as claimed in claim 1, wherein the predetermined structure is bone parts of the subject.

3. The image component separating device as claimed in claim 2, wherein the input medical image, the training images and the supervisor images are each obtained from two radiographic images by calculating a weighted sum for each combination of corresponding pixels between the two radiographic images using predetermined weighting factors, the two radiographic images being formed by two patterns of radiations having different energy distributions transmitted through a subject, and the two radiographic images representing degrees of transmission of the respective radiations through the subject.

4. The image component separating device as claimed in claim 3 further comprising:
input image generating means to generate the input medical image from two radiographic images by calculating a weighted sum for each combination of corresponding pixels between the two radiographic images using predetermined weighting factors, the two radiographic images being formed by two patterns of radiations having different energy distributions transmitted through a subject, and the two radiographic images representing degrees of transmission of the respective radiations through the subject.

5. The image component separating device as claimed in claim 1 further comprising:
image composing means to combine an abnormal component image representing the abnormal component separated by the abnormal component separating means and another image to be combined representing the same site of the same subject imaged from the same observation direction as that of the input medical image by calculating a weighted sum for each combination of corresponding pixels between the images using predetermined weighting factors.

6. The image component separating device as claimed in claim 5, wherein the other image to be combined is a soft part image representing soft parts of the subject.

7. The image component separating device as claimed in claim 6, wherein the soft part image is obtained from two radiographic images by calculating a weighted sum for each combination of corresponding pixels between the two radiographic images using predetermined weighting factors, the two radiographic images being formed by two patterns of radiations having different energy distributions transmitted through a subject, and the two radiographic images representing degrees of transmission of the respective radiations through the subject.

8. The image component separating device as claimed in claim 7, further comprising:
soft part image generating means to generate the soft part image from two radiographic images by calculating a weighted sum for each combination of corresponding pixels between the two radiographic images using predetermined weighting factors, the two radiographic images being formed by two patterns of radiations having different energy distributions transmitted through a subject, and the two radiographic images representing degrees of transmission of the respective radiations through the subject.

9. The image component separating device as claimed in claim 5, wherein the image composing means converts the color of the abnormal component in the abnormal component image into a different color from the color of the other image to be combined, and combines the converted abnormal component image and the other image.

10. The image component separating device as claimed in claim 5, wherein the image composing means applies grayscale conversion to the abnormal component image so that the value of 0 is assigned to pixels of the abnormal component image having pixel values smaller than a predetermined threshold, and combines the converted abnormal component image and the other image.

11. The image component separating device as claimed in claim 1, further comprising:
display means to display at least one of an image containing only the abnormal component separated by the abnormal component separating means and an image in which the abnormal component is enhanced.

12. A normal image generating device comprising:

an input device for inputting a medical image;

means to generate a normal image from the input medical image representing a predetermined structure in a subject by inputting the input medical image to a supervised learned filter, the supervised learned filter being obtained through a regression learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image, wherein the supervised learned filter comprises a plurality of filters for different spatial frequency bands obtained through the learning process carried out for the respective spatial frequency bands, and the normal image generating means generates the normal image by generating a plurality of band-limited images for the respective spatial frequency bands from the input medical image, each band-limited image representing a component for the corresponding spatial frequency band, inputting each band-limited image to corresponding one of the supervised learned filters for the spatial frequency band corresponding to the spatial frequency band of the band-limited image, and reconstructing outputted images for the respective spatial frequency bands outputted from the supervised learned filters.

13. An image component separating method comprising:

a first step to generate, from an input medical image representing a predetermined structure in a subject, a normal image representing a normal structure of the structure in the subject; and a second step to separate an abnormal component in the input medical image by calculating a difference between the input medical image and the normal image, wherein the normal image is generated in the first step by inputting the input medical image to a supervised learned filter, the supervised learned filter being obtained through a regression learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image, wherein the supervised learned filter comprises a plurality of filters for different spatial frequency bands obtained through the learning process carried out for the respective spatial frequency bands, and the normal image is generated by generating a plurality of band-limited images for the respective spatial frequency bands from the input medical image, each band-limited image representing a component for the corresponding spatial frequency band, inputting each band-limited image to corresponding one of the supervised learned filters for the spatial frequency band corresponding to the spatial frequency band of the band-limited image, and reconstructing outputted images for the respective spatial frequency bands outputted from the supervised learned filters.

14. A normal image generating method comprising:

generating a normal image from an input medical image representing a predetermined structure in a subject by inputting the input medical image to a supervised learned filter, the supervised learned filter being obtained through a regression learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image, wherein the supervised learned filter comprises a plurality of filters for different spatial frequency bands obtained through the learning process carried out for the respective spatial frequency bands, and the normal image is generated by generating a plurality of band-limited images for the respective spatial frequency bands from the input medical image, each band-limited image representing a component for the corresponding spatial frequency band, inputting each band-limited image to corresponding one of the supervised learned filters for the spatial frequency band corresponding to the spatial frequency band of the band-limited image, and reconstructing outputted images for the respective spatial frequency bands outputted from the supervised learned filters.

15. A non-transitory recording medium containing an image component separating program to cause a computer to carry out:

a first process to generate, from an input medical image representing a predetermined structure in a subject, a normal image representing a normal structure of the structure in the subject; and a second process to separate an abnormal component in the input medical image by calculating a difference between the input medical image and the normal image, wherein the first process generates the normal image by inputting the input medical image to a supervised learned filter, the supervised learned filter being obtained through a regression learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image, wherein the supervised learned filter comprises a plurality of filters for different spatial frequency bands obtained through the learning process carried out for the respective spatial frequency bands, and the normal image is generated by generating a plurality of band-limited images for the respective spatial frequency bands from the input medical image, each band-limited image representing a component for the corresponding spatial frequency band, inputting each band-limited image to corresponding one of the supervised learned filters for the spatial frequency band corresponding to the spatial frequency band of the band-limited image, and reconstructing outputted images for the respective spatial frequency bands outputted from the supervised learned filters.

16. A non-transitory recording medium containing a normal image generating program to cause a computer to carry out:

a process to generate a normal image from an input medical image representing a predetermined structure in a subject by inputting the input medical image to a supervised learned filter, the supervised learned filter being obtained through a regression learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image, wherein the supervised learned filter comprises a plurality of filters for different spatial frequency bands obtained through the learning process carried out for the respective spatial frequency bands, and the normal image is generated by generating a plurality of band-limited images for the respective spatial frequency bands from the input medical image, each band-limited image representing a component for the corresponding spatial frequency band, inputting each band-limited image to corresponding one of the supervised learned filters for the spatial frequency band corresponding to the spatial frequency band of the band-limited image, and reconstructing outputted images for the respective spatial frequency bands outputted from the supervised learned filters.

17. An image component separating device comprising:

normal image generating means to generate, from an input medical image representing a predetermined structure in a subject, a normal image representing a normal structure of the structure in the subject; and an abnormal component separating means to separate an abnormal component in the input medical image by calculating a difference between the input medical image and the normal image, wherein the normal image generating means comprises a supervised learned filter obtained through a regression learning process using a plurality of training images and corresponding supervisor images, each training image representing the same structure as the predetermined structure in a subject of the same kind as the subject in the input medical image and containing an abnormal component, and each supervisor image representing a normal structure of the structure of the same subject as the subject in the corresponding training image the supervised learned filter receives the input of the input medical image and generates the normal image by applying filtering-process to the input medical image, wherein:

the input medical image is a bone image obtained by energy subtraction technique;

the supervised learned filter receives the input of the bone image and generates the normal image which represents a normal bone structure; and the abnormal component separated by calculating a difference between the input medical image, which is the bone image, and the normal image, which is the normal bone structure, is a calcified portion.

* * * * *